(12) United States Patent
Doi

(10) Patent No.: US 10,049,823 B2
(45) Date of Patent: Aug. 14, 2018

(54) PHOTOELECTRIC CONVERSION ELEMENT

(71) Applicant: FUJIKURA LTD., Koto-ku, Tokyo (JP)

(72) Inventor: Katsuhiro Doi, Chiba (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 427 days.

(21) Appl. No.: 14/185,360

(22) Filed: Feb. 20, 2014

(65) Prior Publication Data

US 2014/0166104 A1    Jun. 19, 2014

Related U.S. Application Data

(63) Continuation of application No. PCT/JP2012/072111, filed on Aug. 31, 2012.

(30) Foreign Application Priority Data

Aug. 31, 2011    (JP) .................................. 2011-190210
Aug. 31, 2011    (JP) .................................. 2011-190211

(51) Int. Cl.
*H01G 9/20*    (2006.01)

(52) U.S. Cl.
CPC ......... *H01G 9/2077* (2013.01); *H01G 9/2031* (2013.01); *H01G 9/2059* (2013.01); *Y02E 10/542* (2013.01)

(58) Field of Classification Search
CPC ... H01G 9/2031; H01G 9/2059; H01G 9/2077
See application file for complete search history.

(56) References Cited

U.S. PATENT DOCUMENTS 6,469,243 B2 * 10/2002 Yamanaka ........... H01G 9/2031
                                                        136/244
7,145,071 B2 * 12/2006 Spivack ............... H01G 9/2027
                                                        136/263

(Continued)

FOREIGN PATENT DOCUMENTS

CN         1703801 A      11/2005
EP         2 249 429 A1   11/2010

(Continued)

OTHER PUBLICATIONS

JP 2004-119149 A online machine translation as provided by Japan Platform for Patent Information, (https://www4.j-platpat.inpit.go.jp/eng/tokujitsu/tkbs_en/TKBS_EN_GM101_Top.action), translated on Jul. 10, 216.*

(Continued)

*Primary Examiner* — Golam Mowla
(74) *Attorney, Agent, or Firm* — Sughrue Mion, PLLC

(57) ABSTRACT

A dye-sensitized solar cell comprises a pair of electrodes that face each other; an electrolyte that is disposed between the pair of electrodes; and a sealing section that connects the pair of electrodes and is provided around the electrolyte. In the dye-sensitized solar cell, the sealing section comprises at least one corner section when the sealing section is viewed in planar view from the electrode side, and a first contact surface at the corner section with at least one of the pair of electrodes comprises a first curve line-containing surface containing a curved curve line on the electrolyte side.

11 Claims, 11 Drawing Sheets

(56) References Cited

U.S. PATENT DOCUMENTS

| | | | | |
|---|---|---|---|---|
| 8,354,584 B2* | 1/2013 | Yoshimoto | ............ | H01G 9/2031 136/251 |
| 2005/0236037 A1* | 10/2005 | Ahn | ................ | H01G 9/2081 136/263 |
| 2010/0012166 A1* | 1/2010 | Yamanaka | ............ | H01G 9/2031 136/244 |
| 2010/0071743 A1* | 3/2010 | Yamanaka | ............ | H01G 9/2081 136/244 |
| 2011/0041909 A1 | 2/2011 | Okada et al. | | |
| 2011/0094561 A1* | 4/2011 | Fukui | ................ | H01G 9/2022 136/244 |
| 2011/0192458 A1* | 8/2011 | Doi | ................ | H01G 9/2077 136/256 |
| 2011/0223703 A1* | 9/2011 | Doi | ................ | B32B 7/02 438/64 |
| 2011/0223704 A1* | 9/2011 | Doi | ................ | H01G 9/2077 438/64 |
| 2012/0118376 A1* | 5/2012 | Lee | ................ | C03C 27/10 136/259 |
| 2012/0298187 A1* | 11/2012 | Kim | ................ | H01G 9/2081 136/251 |
| 2012/0305054 A1* | 12/2012 | Kim | ................ | H01G 9/2077 136/251 |
| 2013/0228208 A1* | 9/2013 | Okada | ................ | H01G 9/2068 136/244 |

FOREIGN PATENT DOCUMENTS

| | | | |
|---|---|---|---|
| EP | 2 352 200 A1 | 8/2011 | |
| EP | 2 395 596 A1 | 12/2011 | |
| EP | 2 403 052 | 1/2012 | |
| EP | 2 453 455 | 5/2012 | |
| EP | 2 461 419 A1 | 6/2012 | |
| JP | 2004-119149 A | 4/2004 | |
| JP | 2006-4827 A | 1/2006 | |
| JP | 2007-258121 A | 10/2007 | |
| JP | 2010-40432 A | 2/2010 | |
| JP | 2010-198821 A | 9/2010 | |
| JP | 2012-113946 A | 6/2012 | |
| JP | 2013-243144 A | 12/2013 | |
| WO | 2009/098857 A1 | 8/2009 | |
| WO | 2010/014161 | 2/2010 | |
| WO | 2010/050207 A1 | 5/2010 | |
| WO | 2010/090145 A1 | 8/2010 | |
| WO | 2010/098311 | 9/2010 | |
| WO | 2011/013423 A1 | 2/2011 | |

OTHER PUBLICATIONS

Extended European Search Report dated Jun. 30, 2015 in European Patent Application No. 12827849.6.
International Search Report for PCT/JP2012/072111 dated Nov. 20, 2012.
Communication dated Nov. 27, 2015 from the Intellectual Property Office of the P.R. China issued in corresponding Application No. 201280036514.1.
Communication dated Dec. 27, 2016, issued by the State Intellectual Property Office of the P.R.C. in corresponding Chinese Application No. 201280036514.1.
Communication dated Nov. 9, 2017, issued by the State Intellectual Property Office of the P.R.C. in corresponding Chinese Application No. 201280036514.1.

* cited by examiner

000
PHOTOELECTRIC CONVERSION ELEMENT

CROSS REFERENCE TO RELATED APPLICATIONS

This application is a Continuation of National Stage of International Application No. PCT/JP2012/72111 filed Aug. 31, 2012, claiming priority based on Japanese Patent Application No. 2011-190210 filed Aug. 31, 2011 and Japanese Patent Application No. 2011-190211 filed Aug. 31, 2011, the contents of all of which are incorporated herein by reference in their entirety.

TECHNICAL FIELD

The present invention relates to a photoelectric conversion element.

BACKGROUND ART

As for photoelectric conversion elements, attention has been paid to dye-sensitized solar cells since they are inexpensive and can provide high photoelectric conversion efficiency. Thus, various developments have been carried out in relation to dye-sensitized solar cells.

A dye-sensitized solar cell generally includes a working electrode having a porous oxide semiconductor layer, a counter electrode, an electrolyte that is disposed between these electrodes, and a sealing section that connects the working electrode and the counter electrode and is provided on the periphery of the electrolyte.

As such a dye-sensitized solar cell, the dye-sensitized solar cell described in Patent Document 1 described below is known. In this dye-sensitized solar cell, there is described a pattern of a sealing section (photocurable resin) having plural corner areas that are seen when the working electrode is viewed from a direction perpendicular to the principal plane of the working electrode, and each of the plural corner areas in the sealing section connects two intersecting linear parts.

CITATION LIST

Patent Document 1: Japanese Patent Application Laid-Open (JP-A) No. 2010-40432 (paragraphs 0137 and 0140, FIG. 11 and FIG. 13)

SUMMARY OF THE INVENTION

Problem to be Solved by the Invention

However, the dye-sensitized solar cell described in Patent Document 1 as described above has the following problems.

That is, in the dye-sensitized solar cell described in Patent Document 1, there is room for improvement in view of suppressing the leakage of the electrolyte.

Therefore, there has been a demand for a dye-sensitized solar cell which can sufficiently suppress leakage of the electrolyte and has excellent durability.

The present invention was achieved in view of such circumstances, and it is an object of the invention to provide a photoelectric conversion element having excellent durability.

Means for Solving Problem

The inventor of the present invention investigated the reason why there is room for improvement in view of suppressing leakage of the electrolyte in the Patent Document 1. As a result, the inventor contemplated that in the dye-sensitized solar cell described in Patent Document 1, leakage of the electrolyte may easily occur due to the following reason. That is, in the dye-sensitized solar cell described in Patent Document 1, the coefficient of linear expansion of the working electrode or the counter electrode is different from the coefficient of linear expansion of the sealing section. Therefore, when the working electrode or the counter electrode undergoes thermal shrinkage as a result of a change in the temperature in the surroundings of the dye-sensitized solar cell, stress is concentrated on the contact surfaces between the working electrode or counter electrode and the various corners of the sealing section. Here, in the dye-sensitized solar cell described in Patent Document 1, the portions on the electrolyte side at the contact surface become points. Therefore, stress is particularly concentrated on those points. As a result, cracks are likely to be generated at the respective corners, starting from the points on the electrolyte side at the contact surface, and the electrolyte is leaked through the cracks so that sufficient durability is not obtained. Thus, the inventor of the present invention repeated thorough investigations, and as a result, the inventor found that when the contact surfaces between the corner sections of the sealing section and the working electrode or counter electrode contain curved curve lines on the electrolyte side, the problems described can be solved. Thus, the inventor finally completed the present invention.

That is, the present invention is a photoelectric conversion element including a pair of electrodes that face each other, an electrolyte that is disposed between the pair of electrodes, and a sealing section that connects the pair of electrodes and is provided around the electrolyte, in which the sealing section has at least one corner section when the sealing section is viewed in planar view from the electrode side, and a first contact surface at the corner section with at least one of the pair of electrodes has a first curve line-containing surface containing a curved curve line on the electrolyte side.

According to this photoelectric conversion element, the corner section in the sealing section has a first curve line-containing surface containing a curve line on the electrolyte side in the first contact surface with at least one of the pair of electrodes. Therefore, when stress occurs in the sealing section as a result of a change in the temperature around the photoelectric conversion element, and stress is concentrated on the corner section, even if stress is concentrated along the curve line of the first curve line-containing surface of the first contact surface at the corner section with at least one of the pair of electrodes, the curve line is subjected to stress as a whole. For this reason, the first curve line-containing surface can sufficiently disperse the stress applied to various points on the curve line. That is, since the first curve line-containing surface is not subjected to stress on a point but is subjected to stress along a line on the electrolyte side, the stress on each of the points on the curve line is reduced, and cracks starting from the points on the curve line are not easily generated. As a result, leaking of the electrolyte through the cracks generated starting from the points on the curve line can be sufficiently suppressed. Therefore, the photoelectric conversion element of the present invention can have excellent durability.

In the photoelectric conversion element, it is preferable that the sealing section include a first sealing section having the first curve line-containing surface, and a second sealing section having a second surface that is included in the first contact surface at the corner section with at least one of the pair of electrodes and is disposed on the opposite side of the electrolyte with respect to the first surface which is the first curve line-containing surface of the first sealing section.

In the photoelectric conversion element having such a configuration, the first contact surface at the corner section with at least one of the pair of electrodes includes not only the first surface which is a first curve line-containing surface, but also a second surface that is disposed on the opposite side (outer side) of the electrolyte with respect to the first surface. Therefore, even if cracks are generated at the first sealing section in the corner section of the sealing section, the electrolyte leaking through the cracks can be stopped at the second sealing section.

The photoelectric conversion element is particularly effective when the radius of curvature of the boundary line between the second surface of the second sealing section and the first surface is smaller than the radius of curvature of the curve line of the first sealing section.

In this case, the stress generated in the vicinity of the boundary line between the second surface of the second sealing section and the first surface is dispersed over the entirety of the first surface of the corner section of the first sealing section, and the effect of suppressing the generation of cracks in the vicinity of the boundary line between the first surface and the second surface is increased.

In the photoelectric conversion element, it is preferable that the boundary line between the first surface and the second surface be a curved curve line.

In the photoelectric conversion element having such a configuration, not only the first surface of the first sealing section but also the second surface of the second sealing section have a curve line on the electrolyte side. Therefore, even if cracks are generated at the curve line of the first surface of the first sealing section, and stress is concentrated along the curve line of the second surface, stress can be sufficiently dispersed at the boundary line between the first surface and the second surface. Therefore, the generation of cracks starting from the points on the boundary line between the first surface and the second surface is sufficiently suppressed.

In the photoelectric conversion element, it is preferable that the melting point of the first sealing section be lower than the melting point of the second sealing section.

In the photoelectric conversion element having such a configuration, when stress is concentrated on the corner section of the sealing section, the first sealing section and the second sealing section are such that since the second sealing section has a longer circumference than the first sealing section, the absolute value of the amount of expansion in an environment in which temperature change occurs is larger, and thus stress is more likely to be concentrated on the first sealing section than in the second sealing section. From that point of view, if the melting point of the first sealing section is lower than the melting point of the second sealing section, the first sealing section becomes softer than the second sealing section. Therefore, even if stress is concentrated on the first sealing section in the corner section of the sealing section, the stress is sufficiently mitigated by the first sealing section.

In the photoelectric conversion element, it is preferable that the first sealing section be formed of a resin material, and the second sealing section be formed of an inorganic material.

In the photoelectric conversion element having such a configuration, when stress is concentrated on the corner section of the sealing section, the first sealing section and the second sealing section are usually such that stress is more likely to be concentrated on the first sealing section than in the second sealing section. From that point of view, when the first sealing section is formed of a resin material, and the second sealing section is formed of an inorganic material, the first sealing section becomes softer than the second sealing section. Therefore, even if stress is concentrated on the first sealing section in the corner section of the sealing section, the stress is more sufficiently mitigated by the first sealing section. In addition, since the second sealing section, which is a portion of the sealing section, is occupied by an inorganic material having higher sealing capability than resin materials, leakage of the electrolyte is more sufficiently suppressed.

In the photoelectric conversion element, it is preferable that any one electrode of the pair of electrodes include a conductive substrate, an oxide semiconductor layer that is provided on the conductive substrate, and a wiring section provided on the conductive substrate so as to surround the oxide semiconductor layer, the wiring section comprise a connecting section that connects a plurality of linear sections, the second contact surface between the connecting section and the conductive substrate comprise a second curve line-containing surface containing a curve line in the periphery that faces the oxide semiconductor layer, and the wiring section comprise a current-collecting wiring provided on the conductive substrate, and a wiring protective layer that covers and protects the current-collecting wiring.

According to this photoelectric conversion element, the connecting section of the wiring section has a second curve line-containing surface containing a curve line in the periphery that faces the oxide semiconductor layer at the second contact surface with the conductive substrate. Therefore, even if stress is generated in the wiring section due to a temperature change around the photoelectric conversion element, and is concentrated on the connecting section, and is concentrated on the second curve line-containing surface in the second contact surface at the connecting section with the conductive substrate, the periphery that faces the oxide semiconductor layer in the second curve line-containing surface is subjected to the stress along the entirety of the curve line, and therefore, the stress applied to the various points on the curve line can be sufficiently dispersed. That is, in the periphery that faces the oxide semiconductor layer, the second curve line-containing surface is not subjected to stress on a point but is subjected to stress on a line. Therefore, the stress at each point along the curve line is decreased, and cracks starting from the points on the curve line of the connecting section are not likely to be generated. As a result, it is sufficiently suppressed that the electrolyte penetrates in through the cracks generated starting from the points on the curve line, and corrodes the current-collecting wiring in the wiring section. Accordingly, the photoelectric conversion element of the present invention can have excellent durability.

In the photoelectric conversion element, it is preferable that the wiring protective layer include a first wiring protective layer having the second curve line-containing surface; and a second wiring protective layer that is included in the second contact surface between the connecting section and the conductive substrate, and has a fourth surface that is disposed between a third surface that is the second curve line-containing surface of the first wiring protective layer and the current-collecting wiring.

According to the photoelectric conversion element having such a configuration, even if cracks are generated in the third surface of the first wiring protective layer, the cracks can be stopped at the fourth surface. Therefore, penetration of the electrolyte through the cracks in the third surface can be stopped at the second wiring protective layer.

In the photoelectric conversion element, it is preferable that the radius of curvature of the boundary line between the fourth surface of the second wiring protective layer and the third surface be smaller than the radius of curvature of the curve line of the first wiring protective layer.

In this case, the stress generated in the vicinity of the boundary line between the fourth surface of the second wiring protective layer and the third surface of the first wiring protective layer is dispersed over the entirety of the third surface of the first wiring protective layer, and the effect of suppressing the generation of cracks in the vicinity of the boundary line between the third surface and the fourth surface is increased.

In the photoelectric conversion element, it is preferable that the boundary line between the third surface and the fourth surface be a curved curve line.

In the photoelectric conversion element having such a configuration, the third surface of the first wiring protective layer as well as the fourth surface of the second wiring protective layer have curve lines. Therefore, even if cracks are generated on the curve line of the third surface of the first wiring protective layer, and stress is concentrated along the boundary line between the third surface and the fourth surface, the stress can be sufficiently dispersed on the boundary line. Accordingly, the generation of cracks starting from the points on the boundary line between the third surface and the fourth surface is sufficiently suppressed.

In the photoelectric conversion element, it is preferable that the melting point of the first wiring protective layer be lower than the melting point of the second wiring protective layer.

In the photoelectric conversion element having such a configuration, when stress is concentrated on the connecting section of the wiring section, the first wiring protective layer and the second wiring protective layer are such that stress is more likely to be concentrated on the first wiring protective layer than on the second wiring protective layer. From that point of view, if the melting point of the first wiring protective layer is lower than the melting point of the second wiring protective layer, the first wiring protective layer becomes softer than the second wiring protective layer. Therefore, even if stress is concentrated on the first wiring protective layer on the connecting section of the wiring section, the stress is sufficiently mitigated by the first wiring protective layer.

In the photoelectric conversion element, it is preferable that the first wiring protective layer be formed of a resin material, and the second wiring protective layer be formed of an inorganic material.

In the photoelectric conversion element having such a configuration, when stress is concentrated on the connecting section of the wiring section, the first wiring protective layer and the second wiring protective layer are usually such that stress is more likely to be concentrated on the first wiring protective layer than on the second wiring protective layer. From that point of view, when the first wiring protective layer is formed of a resin material, and the second wiring protective layer is formed of an inorganic material, the first wiring protective layer becomes softer than the second wiring protective layer. Accordingly, even if stress is concentrated on the first wiring protective layer in the connecting section of the wiring section, the stress is more sufficiently mitigated by the first wiring protective layer. In addition, since the second wiring protective layer which is a portion of the wiring protective layer is occupied by an inorganic material having higher sealing capability than resin materials, penetration of the electrolyte into the current-collecting wiring is more sufficiently suppressed.

Meanwhile, in the present invention, the phrase "when the sealing section is viewed in planar view from the electrode side" means the occasion in which the sealing section is viewed from a direction perpendicular to the surface of the electrode where the sealing section is formed.

Furthermore, in the present invention, the term "curve line" refers to a line having a minimum radius of curvature of greater than 0.3 mm and less than or equal to 500 mm. Furthermore, the radius of curvature of a curve line means the value measured in the following manner. That is, the radius of curvature of a curve line means the value of R that is calculated based on the formula described below, when two points A and B on the curve line are defined, with a point C at which the radius of curvature is determined being disposed between the two points such that line segment AC=line segment BC, and the distance of the line segment AB is designated as L, while the distance between the point C and the straight line AB is designated as D:

$$R=D/2+L^2/8D$$

However, in the curve line, when the line generated due to a problem caused by the accuracy of printing or the like includes undulation, the radius of curvature in that area is not included on the occasion of determining the minimum radius of curvature. Here, the undulation of a line is intended to specifically mean a wave-like line having peak and valley parts that alternately appear along a certain direction and having plural peaks and valleys, in which the peak and valley parts respectively have a radius of curvature of less than 0.1 µm.

Furthermore, in the present invention, the term "corner section" in the sealing section refers to a portion that connects two linear portions. The linear portion as used herein refers to a portion that is a curve having a minimum radius of curvature of greater than 500 mm, or a straight line, in the line (periphery) on the electrolyte side of the first contact surface between the linear portion and the electrode.

Furthermore, in the present invention, the term "periphery" in the wiring section refers to the portion that is in contact with the electrode and connects the lines on the oxide semiconductor layer side, between the two linear portions that are connected to the connecting section of the wiring section. The line as used herein refers to a curve line having a minimum radius of curvature of greater than 500 mm, or a straight line.

Furthermore, in the present invention, the term "melting point" means the value obtainable, in the case where the material that constitutes the first sealing section, the second sealing section, the first wiring protective layer or the second wiring protective layer is other than glass frit, by making measurement using DSC (DSC220 manufactured by Seiko I Techno Research Co., Ltd.) under the conditions at a rate of temperature increase of 10° C./min. When the material that constitutes the first sealing section, the second sealing section, the first wiring protective layer or the second wiring protective layer is glass frit, the melting point refers to the value of the softening point (DTA softening point) obtainable by making measurement using DTA (TG/DTA 7200 manufactured by Seiko I Techno Research Co., Ltd.) under the conditions at a rate of temperature increase of 10° C./min. When the material that constitutes the first sealing section, the second sealing section, the first wiring protective layer or the second wiring protective layer is a material which does not have a melting point but undergoes scorching, the temperature at which scorching occurs is defined as the melting point. The scorching means a carbide material in which at least 1% of the object is carbonized.

Effect of the Invention

According to the present invention, a photoelectric conversion element having excellent durability is provided.

MODE(S) FOR CARRYING OUT THE INVENTION

Hereinafter, embodiments of the present invention will be described in detail with reference to the drawings. Meanwhile, in all of the diagrams, a same symbol will be assigned to a same or equivalent constituent element, and any overlapping descriptions will not be repeated here.

First Embodiment

Figure 1:
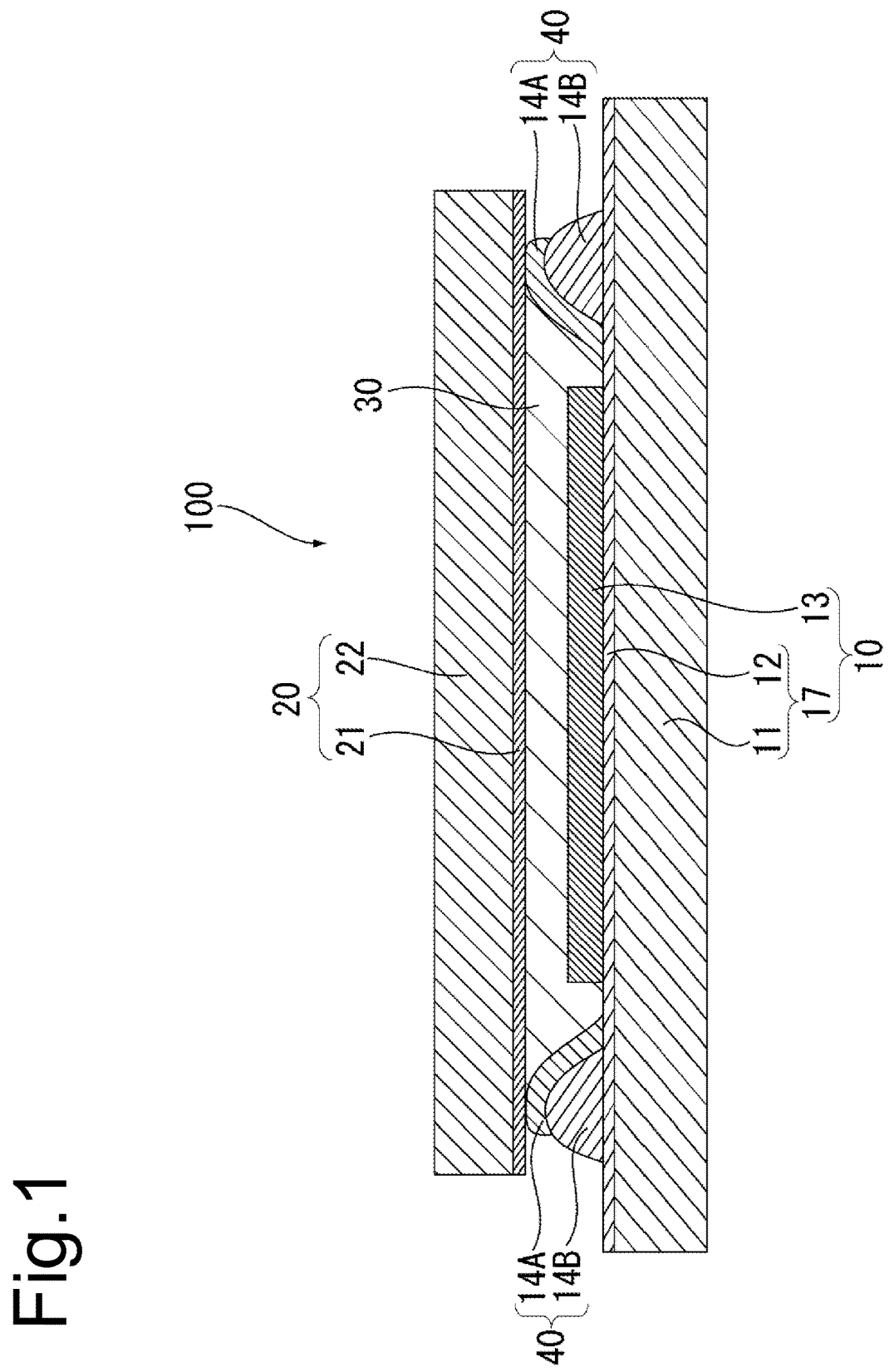
FIG. 1 is a cross-sectional diagram illustrating an embodiment of the photoelectric conversion element according to the present invention.

First, a first embodiment of the photoelectric conversion element according to the present invention will be described with reference to the drawings. FIG. 1 is a cross-sectional diagram illustrating the first embodiment of the photoelectric conversion element according to the present invention.

As illustrated in FIG. 1, a dye-sensitized solar cell 100 includes a working electrode 10, and a counter electrode 20 that is disposed to face the working electrode 10. An electrolyte 30 is disposed between the working electrode 10 and the counter electrode 20, and provided around the electrolyte 30 is an annular sealing section 40 that connects the working electrode 10 and the counter electrode 20.

The working electrode 10 includes a conductive substrate 17 composed of a transparent substrate 11 and a transparent conductive film 12 provided on the counter electrode 20 side of the transparent substrate 11; and a porous oxide semiconductor layer 13 provided on the transparent conductive film 12. The porous oxide semiconductor layer 13 in the working electrode 10 has a photosensitizing dye supported thereon.

The counter electrode 20 includes a counter electrode substrate 22, and a conductive catalyst layer 21 that is provided on the working electrode 10 side of the counter electrode substrate 22 and accelerates a reduction reaction at the surface of the counter electrode 20.

Figure 2:
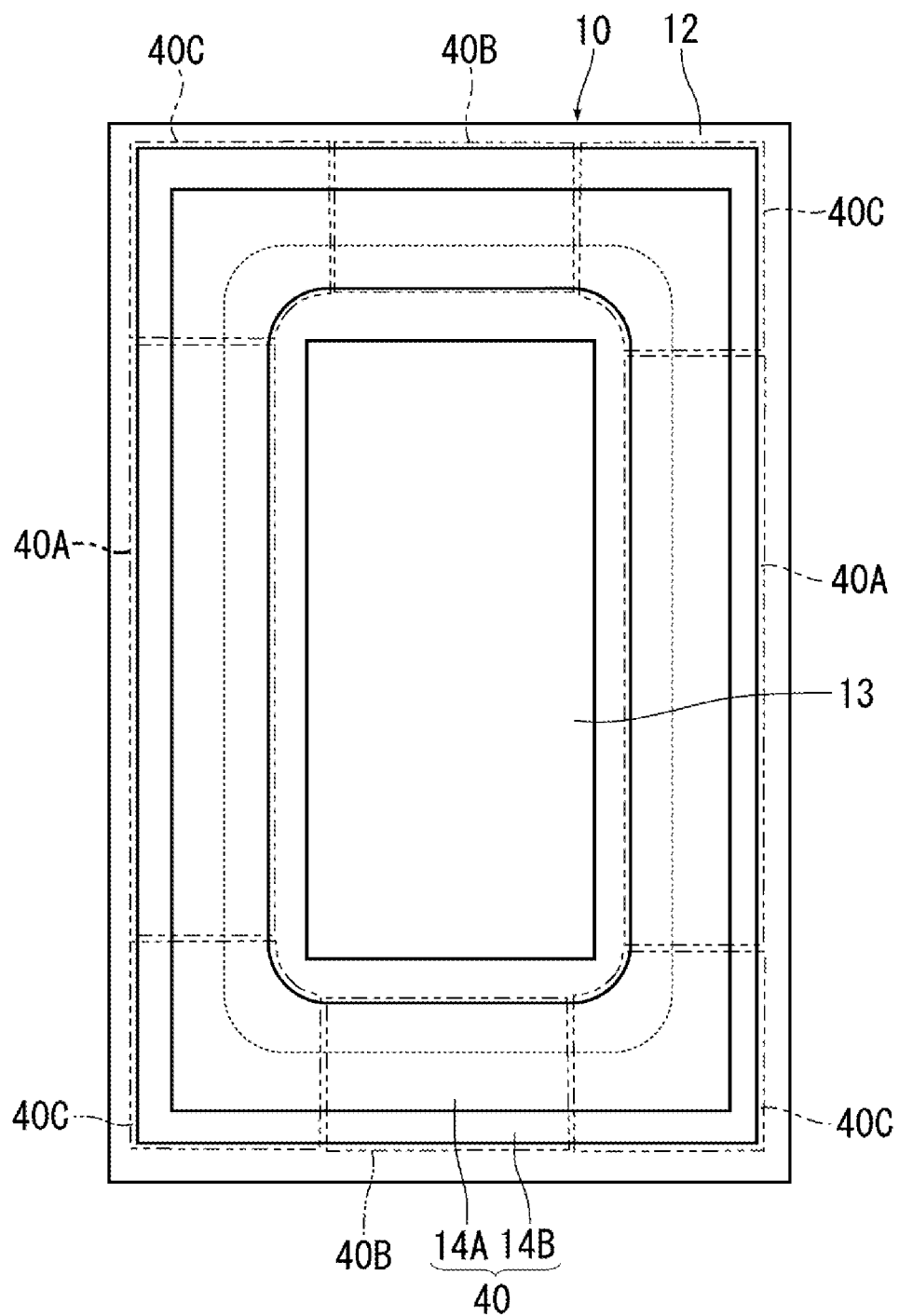
FIG. 2 is a plan view illustrating a working electrode and a sealing section.

FIG. 2 is a plan view illustrating the working electrode 10 and the sealing section 40 that are viewed in planar view from the counter electrode 20 side. As illustrated in FIG. 2, the sealing section 40 forms a quadrilateral annular shape. Specifically, the sealing section 40 has a pair of linear sections 40A that are parallel to each other when the sealing section 40 is viewed in planar view from the counter electrode 20 side; a pair of linear sections 40B that are perpendicular to the linear sections 40A and are parallel to each other; and four corner sections 40C that connect the linear sections 40A and the linear sections 40B.

Figure 3:
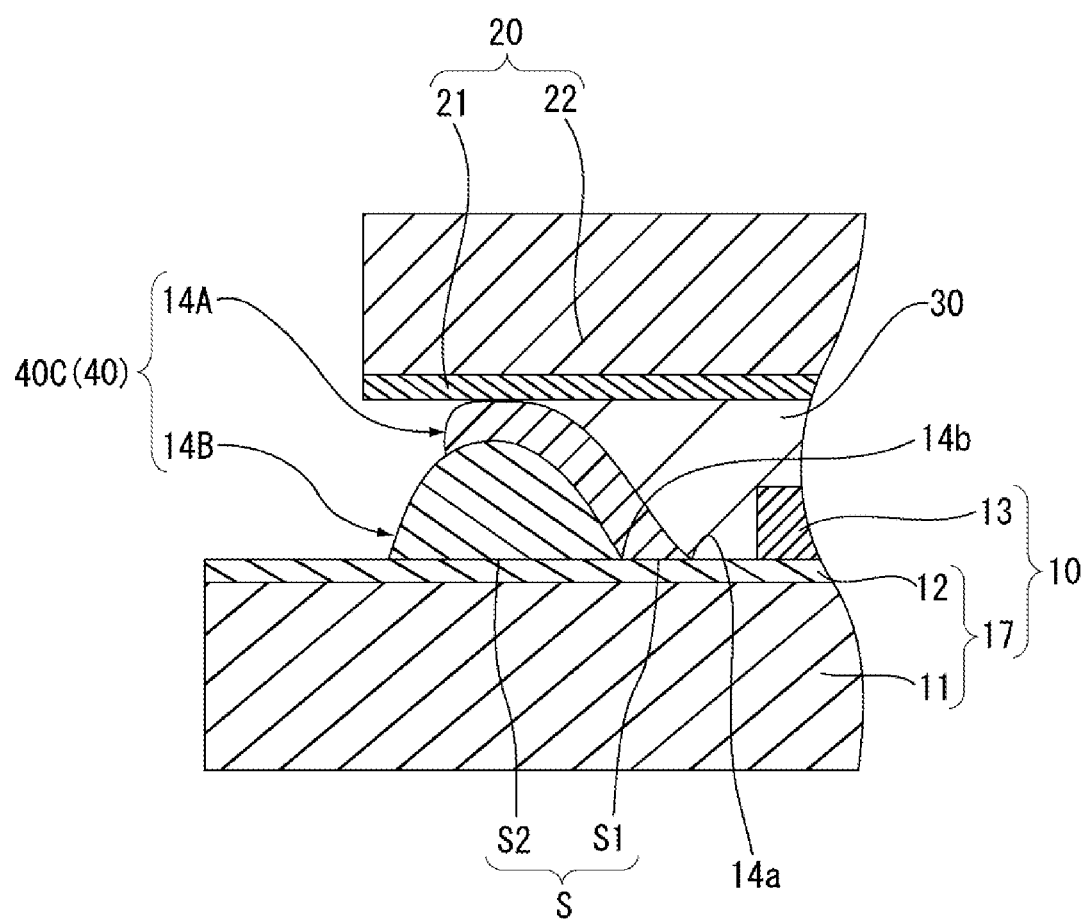
FIG. 3 is a partially magnified diagram of FIG. 1.
Figure 4:
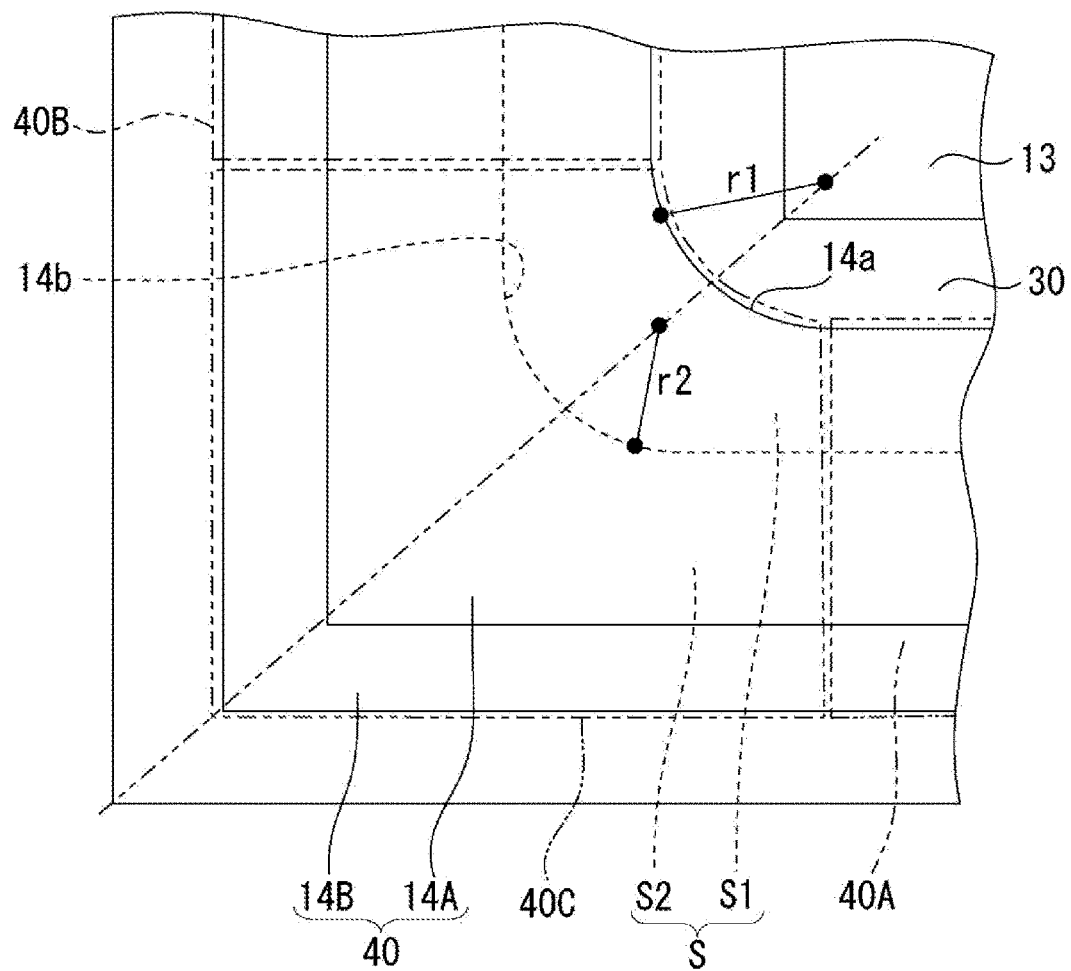
FIG. 4 is a partially magnified diagram of FIG. 2.

FIG. 3 is a partially magnified diagram of FIG. 1, and FIG. 4 is a partially magnified diagram of FIG. 2. To be more specific, FIG. 3 shows a cross-section of the sealing section 40 that passes through the corner sections 40C. As shown in FIG. 3 and FIG. 4, the sealing section 40 includes a first sealing section 14A and a second sealing section 14B. The second sealing section 14B is fixed onto the transparent conductive film 12 of the working electrode 10, and the first sealing section 14A is provided so as to intercept between the second sealing section 14B and the electrolyte 30 and to thereby protect the second sealing section 14B from the electrolyte 30. Furthermore, the first sealing section 14A covers only a portion of the second sealing section 14B and connects the second sealing section 14B and the counter electrode 20. Here, the portion of the second sealing section 14B is a region on the electrolyte 30 side and a region that faces the counter electrode 20. The remaining portion of the second sealing section 14B is exposed. The remaining portion of the sealing section 14B is a region that is on the opposite side of the electrolyte 30 in the second sealing section 14B.

A contact surface S between the sealing section 40 and the working electrode 10 is composed of a first surface S1 that is in contact with the working electrode 10 in the first sealing section 14A; and a second surface S2 that is in contact with the working electrode 10 in the second sealing section 14B. The first surface S1 is on the electrolyte 30 side with respect to the second surface S2, and the first surface S1 has a curved curve line 14a on the electrolyte 30 side. Therefore, a first curve line-containing surface is constructed by the first surface S1. The second surface S2 has a boundary line 14b with the first surface S1 on the electrolyte 30 side.

According to the dye-sensitized solar cell 100, each of the corner sections 40C in the sealing section 40 has the first surface S1 containing a curve line 14a on the electrolyte 30 side, in the contact surface S with the working electrode 10. Therefore, even if stress is generated in the sealing section 40 due to a temperature change around the dye-sensitized solar cell 100, the stress is thereby concentrated on the corner sections 40C, and stress is concentrated along the curve line 14a of the first surface S1 in the contact surface S at the corner section 40C with the working electrode 10, the curve line 14a is subjected to stress as a whole. Therefore, the stress that is applied to various points on the curve line 14a can be sufficiently dispersed. That is, the first surface S1 is not subjected to stress on a point but is subjected to stress along a line, on the electrolyte 30 side. Therefore, stress on each point along the curve line 14a is reduced, and cracks starting from the points on the curve line 14a of the corner section 40C are not likely to be generated. As a result, it is sufficiently suppressed that the electrolyte 30 leaks through cracks generated starting from the points on the curve line 14a. Accordingly, the dye-sensitized solar cell 100 can have excellent durability.

Furthermore, in the dye-sensitized solar cell 100, the contact surface S at the corner section 40C with the working electrode 10 has a second surface S2 that is disposed on the opposite side of the electrolyte 30 with respect to the first surface S1 of the first sealing section 14A. That is, the contact surface S at the corner section 40C with the working electrode 10 has not only the first surface S1 but also the second surface S2 on the outer side. Therefore, even if cracks are generated in the first sealing section 14A, the electrolyte 30 leaking through the cracks can be stopped by the second sealing section 14B.

Here, the sealing section 40 will be described in detail with reference to FIG. 3 and FIG. 4.

As illustrated in FIG. 3 and FIG. 4, the first surface S1 in the corner section 40C of the sealing section 40 is on the electrolyte 30 side with respect to the second surface S2, and the first surface S1 has a curved curve line 14a on the electrolyte 30 side. Here, the curve line 14a is approximately arc-shaped, and is convex toward a direction away from the electrolyte 30 and the porous oxide semiconductor layer 13. The radius of curvature of the curve line 14a is designated as r1 (FIG. 4).

The second surface S2 has a boundary line 14b between the second surface S2 and the first surface S1. Here, the boundary line 14b may be a curved curve line, or may be a non-curve line that is not curved. Here, a non-curve line refers to a line having a radius of curvature of 0.3 mm or less. In FIG. 4, the boundary line 14b forms a curve line. This curve line is approximately arc-shaped, and is convex toward a direction away from the electrolyte 30 and the porous oxide semiconductor layer 13. Here, the radius of curvature r2 of the boundary line 14b between the first surface S1 and the second surface S2 may be smaller than the radius of curvature r1 of the curve line 14a of the first surface S1, or may be greater than or equal to the radius of curvature r1 of the curve line 14a; however, when the radius of curvature r2 is smaller than the radius of curvature r1 of the curve line 14a of the first surface S1, that is, when the radius of curvature r1 of the curve line 14a of the first surface S1 is larger than the radius of curvature r2 of the boundary line 14b of the second surface S2, the present invention is particularly effective. In this case, the stress generated in the vicinity of the boundary line 14b between the second surface S2 of the second sealing section 14B and the first surface S1 is dispersed over the entirety of the first surface S1 of the first sealing section 14A, and the effect of suppressing the generation of cracks in the vicinity of the boundary line 14b of the second surface S2 is increased.

When the radius of curvature r2 of the boundary line 14b between the first surface S1 and the second surface S2 is smaller than the radius of curvature r1 of the curve line 14a of the first surface S1, the value of r1−r2 is preferably 0.2 mm or greater, and more preferably 0.2 mm to 49.8 mm, for the reason that the generation of cracks is effectively suppressed.

The radius of curvature r1 of the curve line 14a may be greater than 0.3 mm and less than or equal to 500 mm; however, in order to effectively suppress the generation of cracks in the vicinity of the boundary line 14b of the second surface S2, the radius of curvature r1 is preferably 0.5 mm or greater. However, for the reason of increasing the distance between the curve line 14a and the porous oxide semiconductor layer 13, and thus preventing contamination of the porous oxide semiconductor layer 13, the radius of curvature r1 of the curve line 14a is preferably 50 mm or less, and more preferably 30 mm or less.

The melting point (Tm1) of the first sealing section 14A may be lower than, equal to, or higher than the melting point (Tm2) of the second sealing section 14B; however, it is preferable that the melting point of the first sealing section 14A be lower. In the dye-sensitized solar cell 100, when stress is concentrated on the corner section 40C of the sealing section 40, the first sealing section 14A and the second sealing section 14B are such that since the second sealing section 14B has a longer circumference than the first sealing section 14A, the absolute value of the amount of expansion in an environment where temperature change occurs is increased, and stress is likely to be concentrated. From that point of view, if the melting point of the first sealing section 14A is lower than the melting point of the second sealing section 14B, the first sealing section 14A becomes softer than the second sealing section 14B. Thus, even if stress is concentrated on the first sealing section 14A in the corner section 40C of the sealing section 40, the stress is sufficiently mitigated by the first sealing section 14A.

Here, in order to mitigate the stress to the first sealing section 14A in the corner section 40C of the sealing section 40 while maintaining the shape of the sealing section 40, the value of Tm2−Tm1 is preferably 20° C. or higher, and more preferably 50° C. or higher. However, the value of Tm2−Tm1 is preferably 500° C. or lower.

Furthermore, the melting point (Tm1) of the first sealing section 14A is usually 95° C. to 200° C., but for the reason that as the processing temperature of the first sealing section 14A is lower, processing is made easier, the melting point (Tm1) is preferably 95° C. to 150° C., and more preferably 95° C. to 130° C.

The first sealing section 14A and the second sealing section 14B may be respectively composed of any one of a resin material or an inorganic material.

Examples of the resin material include thermoplastic resins such as modified polyolefins including an ionomer, an ethylene-anhydrous vinyl acetate copolymer, an ethylene-methacrylic acid copolymer, and an ethylene-vinyl alcohol copolymer; ultraviolet-cured resins, and vinyl alcohol polymers. Meanwhile, when a resin material is used for the second sealing section 14B, an epoxy resin can also be used in addition to the resins described above.

Examples of the inorganic material include inorganic insulating materials such as lead-free transparent low-melting point glass frit. Here, as the low-melting point glass frit, for example, one having a softening point of 150° C. to 550° C. can be used.

In the sealing section 40, it is preferable that the first sealing section 14A be formed of a resin material, and the second sealing section 14B be formed of an inorganic material.

In this case, when stress is concentrated on the corner section 40C of the sealing section 40, the first sealing section 14A and the second sealing section 14B are usually such that stress is likely to be concentrated on the first sealing section 14A than in the second sealing section 14B. From that point of view, when the first sealing section 14A is formed of a resin material, and the second sealing section 14B is formed of an inorganic material, the first sealing section 14A becomes softer than the second sealing section 14B. For this reason, even if stress is concentrated on the first sealing section 14A in the corner section 40C of the sealing section 40, the stress is sufficiently mitigated by the first sealing section 14A. In addition, since the second sealing section 14B which is a portion of the sealing section 40 is occupied by an inorganic material having higher sealing capability than resin materials, leakage of the electrolyte 30 is more sufficiently suppressed.

Next, the method for producing the dye-sensitized solar cell 100 will be described.

[Preparation Process]

First, a working electrode 10 and a counter electrode 20 are prepared.

(Working Electrode)

The working electrode 10 can be obtained as follows.

First, a transparent conductive film 12 is formed in the transparent substrate 11 to form a laminate. As the method for forming the transparent conductive film 12, a sputtering method, a vapor deposition method, a spray pyrolysis deposition method (SPD), a CVD method, or the like is used.

The material that constitutes the transparent substrate 11 may be, for example, any transparent material, and examples of such a transparent material include glasses such as borosilicate glass, soda lime glass, glass which is made of soda lime and whose iron component is less than that of ordinary soda lime glass, and quartz glass; and resin films of polyethylene terephthalate (PET), polyethylene naphthalate (PEN), polycarbonate (PC), polyether sulfone (PES), and the like. The thickness of the transparent substrate 11 is appropriately determined according to the size of the dye-sensitized solar cell 100, and there are no particular limitations. However, the thickness may be in the range of, for example, 50 μm to 10,000 μm.

Examples of the material that constitutes the transparent conductive film 12 include conductive metal oxides such as indium tin oxide (ITO), tin oxide ($SnO_2$), and fluorine-doped tin oxide (FTO). The transparent conductive film 12 may be composed of a single layer, or a laminate of plural layers formed from different conductive metal oxides. When the transparent conductive film 12 is composed of a single layer, since the transparent conductive film 12 has high heat resistance and high chemical resistance, it is preferable that the transparent conductive film 12 be formed of FTO. Furthermore, when a laminate composed of plural layers is used as the transparent conductive film 12, it is preferable because the characteristics of the various layers can be reflected. Among others, it is preferable to use a laminate of a layer formed of ITO and a layer formed of FTO. In this case, a transparent conductive film 12 having high conductivity, heat resistance and chemical resistance can be realized. The thickness of the transparent conductive film 12 may be in the range of, for example, 0.01 μm to 2 μm.

Next, a paste for porous oxide semiconductor layer formation is printed on the transparent conductive film 12 obtained as described above. The paste for porous oxide semiconductor layer formation contains a resin such as polyethylene glycol, and a solvent such as terpineol, in addition to oxide semiconductor particles.

Examples of the oxide semiconductor particles include titanium oxide ($TiO_2$), silica ($SiO_2$), zinc oxide (ZnO), tungsten oxide ($WO_3$), niobium oxide ($Nb_2O_5$), strontium titanate ($SrTiO_3$), tin oxide ($SnO_2$), indium oxide ($In_2O_3$), zirconium oxide ($ZrO_2$), thallium oxide ($Ta_2O_5$), lanthanum oxide ($La_2O_3$), yttrium oxide ($Y_2O_3$), holmium oxide ($Ho_2O_3$), bismuth oxide ($Bi_2O_3$), cerium oxide ($CeO_2$), aluminum oxide ($Al_2O_3$). These can be used alone or as a combination of two or more kinds thereof. As the method for printing the paste for porous oxide semiconductor layer formation, for example, a screen printing method, a doctor blade method, or a bar coating method can be used.

Next, a porous oxide semiconductor layer 13 is formed on the transparent conductive film 12 by calcining the paste for porous oxide semiconductor layer formation. The calcination temperature may vary depending on the oxide semiconductor particles, but the calcination temperature is usually 350° C. to 600° C. The calcination time may also vary depending on the oxide semiconductor particles, but the calcination time is usually 1 hour to 5 hours.

The porous oxide semiconductor layer 13 is constituted by the oxide semiconductor particles described above. The average particle size of these oxide semiconductor particles is preferably 1 nm to 1000 nm, from the viewpoint that the surface area of the oxide semiconductor covered with a dye is increased, that is, the place for implementing photoelectric conversion is enlarged, and more numerous electrons can be generated. Here, it is preferable that the porous oxide semiconductor layer 13 be composed of a laminate formed by laminating oxide semiconductor particles having different particle size distributions. In this case, reflection of light can be caused to occur repeatedly inside the laminate, and light can be efficiently converted to electrons without letting any incident light escape to the outside of the laminate. The thickness of the porous oxide semiconductor layer 13 may be, for example, 0.5 μm to 50 μm. Meanwhile, the porous oxide semiconductor layer 13 can also be composed of a laminate of plural semiconductor layers respectively formed of different materials.

(Counter Electrode)

On the other hand, the counter electrode 20 can be obtained as follows.

That is, first, a counter electrode substrate 22 is prepared (FIG. 4). Then, a catalyst layer 21 is formed on the counter electrode substrate 22. As the method for forming the catalyst layer 21, a sputtering method, a vapor deposition method or the like is used. Among these, a sputtering method is preferred in view of uniformity of the film.

The counter electrode substrate 22 is composed of corrosion resistance metal material such as titanium, nickel, platinum, molybdenum, tungsten or the like; or a substrate obtained by forming a conductive oxide such as ITO or FTO on the transparent substrate 11 mentioned above.

The catalyst layer 21 is composed of platinum, a carbon-based material, a conductive polymer, or the like.

The thickness of the counter electrode 20 may be in the range of, for example, 0.005 to 0.5 mm.

[Second Sealing Section Material Forming and Fixing Process]

Next, a second sealing section forming material that forms the second sealing section 14B is fixed to a first annular area that is a site on the surface of the transparent conductive film 12 in the working electrode 10 and surrounds the porous oxide semiconductor layer 13. For example, in a case in which the second sealing section 14B is formed of an inorganic insulating material such as, for example, lead-free transparent low-melting point glass frit, the second sealing section forming material can be obtained by applying a paste containing that inorganic insulating material at the first annular area, and calcining the paste. Meanwhile, when the boundary line 14b on the electrolyte 30 side in the second surface S2 of the second sealing section 14B is a curve line, a screen printing plate on which an annular slit having an inner circumferential surface at the corner sections is formed may be disposed on the surface of the transparent conductive film 12, and the paste may be applied on the first annular area by introducing the paste into the annular slit, and then calcined. At this time, as the screen printing plate, a printing plate in which a line in the curved inner circumferential surface, which is expected to be in contact with the working electrode 10, is a curve line having a predetermined radius of curvature is used. Alternatively, in an environment under an atmosphere of the solvent that is included in the paste used, the paste may be allowed to naturally flow until the line in the inner circumferential surface of the corner sections of the applied paste and which is to be in contact with the working electrode 10 becomes a curve line having a predetermined radius of curvature, and then the paste may be calcined.

When a thermoplastic resin is used as the second sealing section forming material, a quadrilateral annular resin sheet formed of a thermoplastic resin is prepared. At this time, the resin sheet is molded such that the line in the inner circumferential surface at the corner sections of the resin sheet and which is expected to be in contact with the working electrode 10, becomes a curve line having a predetermined radius of curvature. Then, the resin sheet is disposed on the first annular area of the working electrode 10 and heated to melt. In this manner, the second sealing section forming material can be fixed to the first annular area of the working electrode 10.

When an ultraviolet-curable resin is used as the second sealing section forming material, as the method of fixing the second sealing section forming material to the first annular area, there are available a printing method of printing the second sealing section forming material by screen printing or the like; and a drawing method of drawing the second sealing section forming material using a dispenser or the like. In the case of fixing the second sealing section forming material to the first annular area using a printing method, the boundary line 14b on the electrolyte 30 side in the second surface S2 of the second sealing section 14B can be formed into a curve line in the same manner as in the case of using a paste. In the case of fixing the second sealing section forming material to the first annular area using a drawing method, the second sealing section forming material formed at the corner sections is intentionally increased by decreasing the rate of drawing at the time of drawing the corner sections or the like, and the second sealing section forming material may be allowed to flow naturally until the line in the inner circumferential surface of the corner sections of the applied paste and which is to be in contact with the working electrode 10, becomes a curve line having a predetermined radius of curvature.

[First Sealing Section Forming Material Fixing Process]

On the other hand, a first sealing section forming material that forms the first sealing section 14A is fixed to the second annular area, which is a site on the surface of the counter electrode 20.

When a thermoplastic resin such as, for example, a modified polyolefin including an ionomer, an ethylene-anhydrous vinyl acetate copolymer, an ethylene-methacrylic acid copolymer or an ethylene-vinyl alcohol copolymer is used as the first sealing section forming material, for example, an annular resin sheet formed of a thermoplastic resin is prepared, the resin sheet is molded while leaving a curved shape in advance in the inner circumferential surface of the corner sections of the resin sheet, and then this resin sheet is disposed on the second annular area and heated to melt. Thereby, the line on the electrolyte 30 side of the first surface S1 can be formed into a curve line.

[Dye Supporting Process]

Next, a photosensitizing dye is supported on the porous oxide semiconductor layer 13 of the working electrode 10. For this purpose, a photosensitizing dye may be adsorbed to the porous oxide semiconductor layer 13 by immersing the working electrode 10 into a solution containing the photosensitizing dye, thereby adsorbing the photosensitizing dye to the porous oxide semiconductor layer 13, subsequently washing away any excess photosensitizing dye with the solvent component of the solution, and drying the porous oxide semiconductor layer. However, a photosensitizing dye can be supported on the porous oxide semiconductor layer 13 by applying a solution containing the photosensitizing dye on the porous oxide semiconductor layer 13, and subsequently drying the solution to thereby adsorb the photosensitizing dye to the porous oxide semiconductor layer 13.

Examples of the photosensitizing dye include ruthenium complexes having ligands containing a bipyridine structure, a terpyridine structure and the like; and organic dyes such as porphyrin, eosin, rhodamine, and merocyanine.

[Electrolyte Layer Disposing Process]

Next, an electrolyte 30 is disposed on the inner side of the second sealing section forming material on the working electrode 10. The electrolyte 30 can be obtained by injecting on the inner side of the second sealing section forming material on the working electrode 10, or printing.

Here, when the electrolyte 30 is in a liquid state, the electrolyte 30 can be injected until the electrolyte 30 flows over the second sealing section forming material to the outer side of the second sealing section forming material. In this case, the electrolyte 30 can be sufficiently injected on the inner side of the second sealing section forming material. Furthermore, on the occasion of attaching the second sealing section forming material and the first sealing section forming material, and thereby forming the sealing section 40 composed of the second sealing section 14B and the first sealing section 14A, air can be sufficiently expelled from the cell space surrounded by the working electrode 10, the counter electrode 20 and the sealing section 40, and the photoelectric conversion characteristics of the dye-sensitized solar cell 100 thus obtainable can be sufficiently enhanced.

The electrolyte 30 is usually composed of an electrolytic solution, and this electrolytic solution contains, for example, a redox couple such as $I^-/I_3^-$, and an organic solvent. Examples of the organic solvent that can be used include acetonitrile, methoxyacetonitrile, methoxypropionitrile, propionitrile, ethylene carbonate, propylene carbonate, diethyl carbonate, γ-butyrolactone, valeronitrile, pivalonitrile, glutaronitrile, methacrylonitrile, isobutyronitrile, phenylacetonitrile, acrylonitrile, succinonitrile, oxalonitrile, pentanitrile, and adiponitrile. Examples of the redox couple include redox couples of $I^-/I_3^-$ as well as bromine/bromide ion, zinc complexes, iron complexes, and cobalt complexes.

Furthermore, an ionic liquid is also acceptable for the electrolyte 30 instead of the organic solvent. Examples of the ionic liquid used include iodine salts that are already known, such as a pyridinium salt, an imidazolium salt, and a triazolium salt, and normal temperature molten salts that are in a molten state at near room temperature. Examples of such normal temperature molten salts that are suitably used include 1-ethyl-3-methylimidazolium bis(trifluoromethylsulfonyl)imide, 1-hexyl-3-methylimidazolium iodide, 1-ethyl-3-propylimidazolium iodide, dimethylimidazolium iodide, ethylmethylimidazolium iodide, dimethylpropylimidazolium iodide, butylmethylimidazolium iodide, and methylpropylimidazolium iodide.

Furthermore, a mixture of the ionic liquid described above and the organic solvent described above may be used as the electrolyte 30.

Furthermore, additives may be added to the electrolyte 30. Examples of the additives include LiI, $I_2$, 4-t-butylpyridine, guanidium thiocyanate, 1-methylbenzimidazole, and 1-butylbenzimidazole.

Furthermore, it is also acceptable to use, as the electrolyte 30, a nanocomposite gel electrolyte which is a quasi-solid electrolyte formed into a gel form by kneading nanoparticles such as $SiO_2$, $TiO_2$ or carbon nanotubes with the electrolytes described above. Furthermore, an electrolyte that has been gelled by using an organic gelling agent such as polyvinylidene fluoride, a polyethylene oxide derivative or an amino acid derivative, may also be used.

[Superimposition Process]

Next, the working electrode 10 and the counter electrode 20 are disposed to face each other, and a second sealing section forming material and a first sealing section forming material are superimposed thereon.

[Sealing Section Forming Process]

Next, the first sealing section forming material is affixed to the second sealing section forming material. At this time, a second sealing section 14B is formed by the second sealing section forming material. Furthermore, when the first sealing section forming material is composed of, for example, a resin material, and the resin material is melted, the viscosity of the first sealing section forming material is decreased, and the region on the electrolyte 30 side of the second sealing section 14B and the region that faces the counter electrode 20 are covered with the first sealing section forming material. Furthermore, the first sealing section forming material is brought into contact with a portion of the transparent conductive film 12 in the working electrode 10. In this manner, the first sealing section 14A is formed.

At this time, superimposition of the first sealing section forming material and the second sealing section material can be carried out, for example, at atmospheric pressure.

Furthermore, pressurization of the second sealing section forming material and the first sealing section forming material is usually carried out at 1 MPa to 50 MPa, preferably 2 MPa to 30 MPa, and more preferably 3 MPa to 20 MPa.

For example, when a thermoplastic resin is used as the resin that constitutes the first sealing section forming material, the temperature at the time of melting the first sealing section forming material is set to be higher than or equal to the melting point of the first sealing section forming material.

However, the temperature at the time of melting the first sealing section forming material is preferably lower than or equal to the (melting point of the resin included in the first sealing section forming material+200° C.) If the temperature is higher than the (melting point of the resin included in the first sealing section forming material+200° C.), there is a risk that the resin included in the first sealing section forming material may be decomposed by heat.

In this manner, the dye-sensitized solar cell 100 is obtained, and production of the dye-sensitized solar cell 100 is completed.

Meanwhile, in the first embodiment, the counter electrode 20 is prepared before the second sealing section forming material fixing process, but it is desirable that the counter electrode 20 be prepared prior to the superimposition process. For this reason, the counter electrode 2 may be formed after the second sealing section forming material fixing process. For example, the counter electrode 20 may be prepared between the superimposition process and the electrolyte disposition process, between the electrolyte disposition process and the dye supporting process, or between the dye supporting process and the first sealing section forming material fixing process.

Furthermore, in the first embodiment, when the dye-sensitized solar cell 100 is produced, the electrolyte 30 is disposed on the inner side of the second sealing section forming material fixed to the working electrode 10, but the electrolyte 30 may also be disposed on the inner side of the first sealing section forming material fixed to the counter electrode 20 on the counter electrode 20. In this case, it is not necessarily to have the working electrode 10 prepared before the second sealing section forming material fixing process. That is, it is acceptable to have the working electrode 10 prepared before the superimposition process. Therefore, the working electrode 10 may be formed after the second sealing section forming material fixing process.

Second Embodiment

Figure 5:
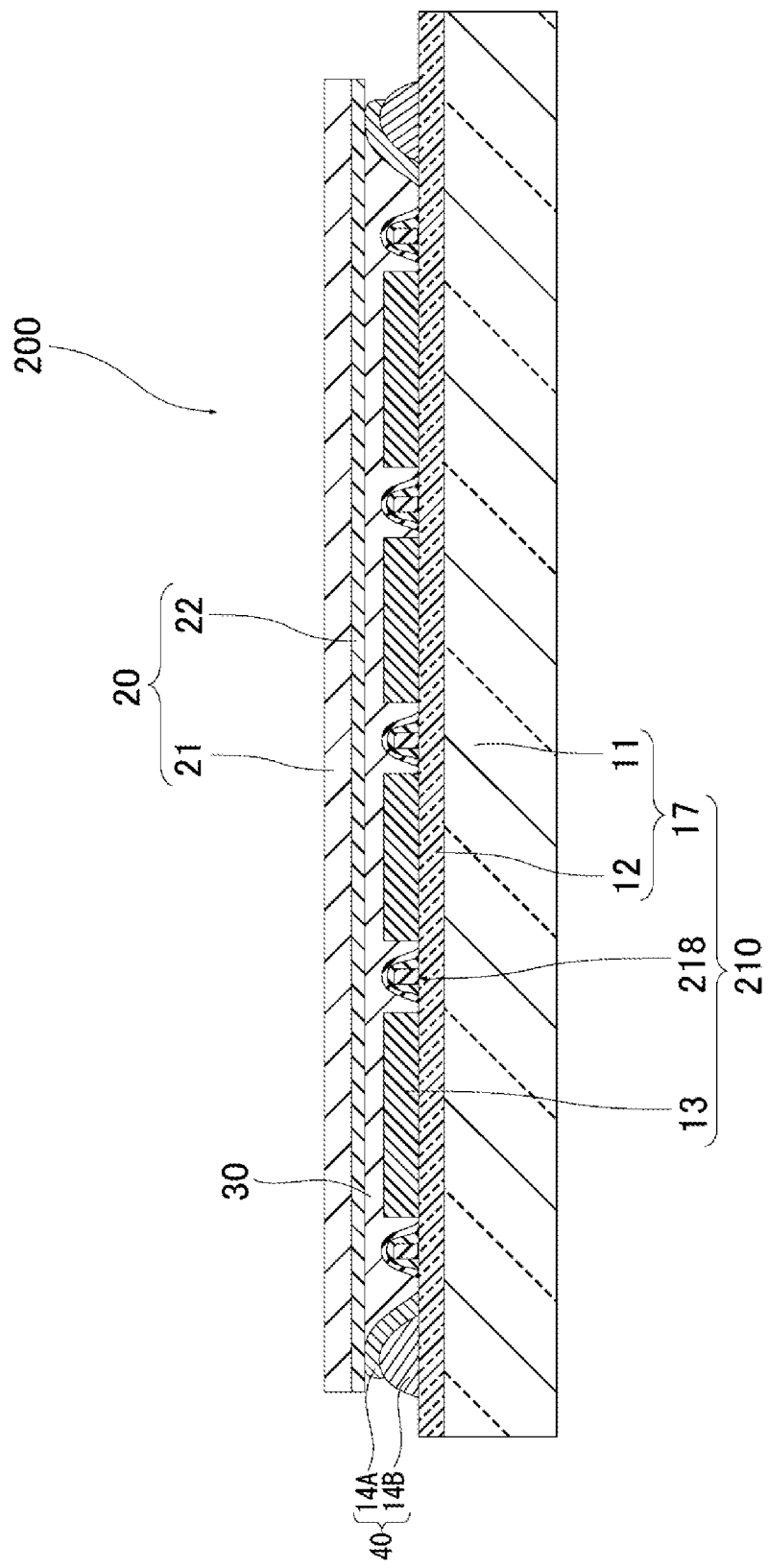
FIG. 5 is a cross-sectional diagram illustrating another embodiment of the photoelectric conversion element according to the present invention.

First, a second embodiment of the photoelectric conversion element according to the present invention will be described with reference to FIG. 5. FIG. 5 is a cross-sectional diagram illustrating the second embodiment of the photoelectric conversion element according to the present invention.

As illustrated in FIG. 5, a dye-sensitized solar cell 200 as a photoelectric conversion element is different from the dye-sensitized solar cell of the first embodiment in that a working electrode 210 is used instead of the working electrode 10. Specifically, the working electrode 210 is different from the working electrode 10 in that the working electrode 210 further includes a wiring section 218 on a conductive substrate 17 composed of a transparent substrate 11 and a transparent conductive film 12 provided on the counter electrode 20 side of the transparent substrate 11, and in that the working electrode 210 includes plural porous oxide semiconductor layers 13.

Figure 6:
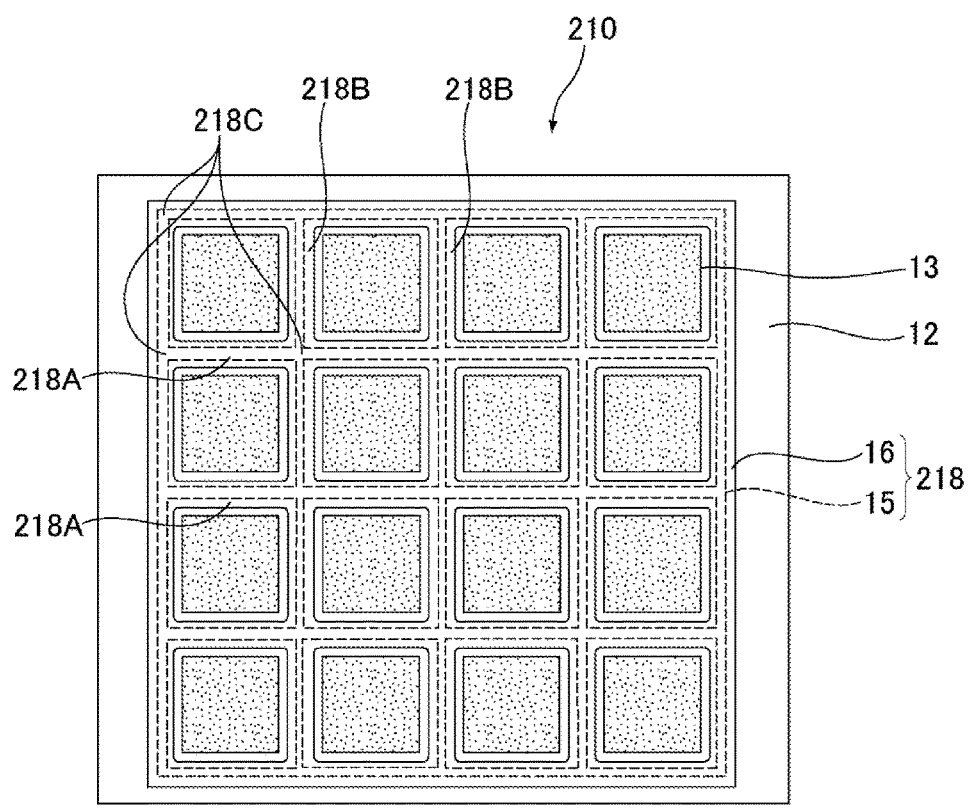
FIG. 6 is a plan view of the working electrode of FIG. 5.

The wiring section 218 will be described using FIG. 6 to FIG. 8. FIG. 6 is a plan view illustrating the working electrode of FIG. 5, FIG. 7 is a partially magnified diagram of FIG. 5, and FIG. 8 is a partially magnified diagram of FIG. 6.

As illustrated in FIG. 6, the wiring section 218 includes, when the wiring section 218 is viewed in planar view from the counter electrode 20 side, a plurality of linear sections 218A that are parallel to each other; a plurality of linear sections 218B that are parallel to each other and perpendicular to the linear sections 218A; and a connecting section 218C that connects the linear section 218A and the linear section 218B. Regarding the connecting section 218C, there are a case in which two linear sections 218A and two linear sections 218B are connected, a case in which two linear sections 218A and one linear section 218B are connected, a case in which one linear section 218A and two linear sections 218B are connected, and a case in which one linear section 218A and one linear section 218B are connected.

Figure 7:
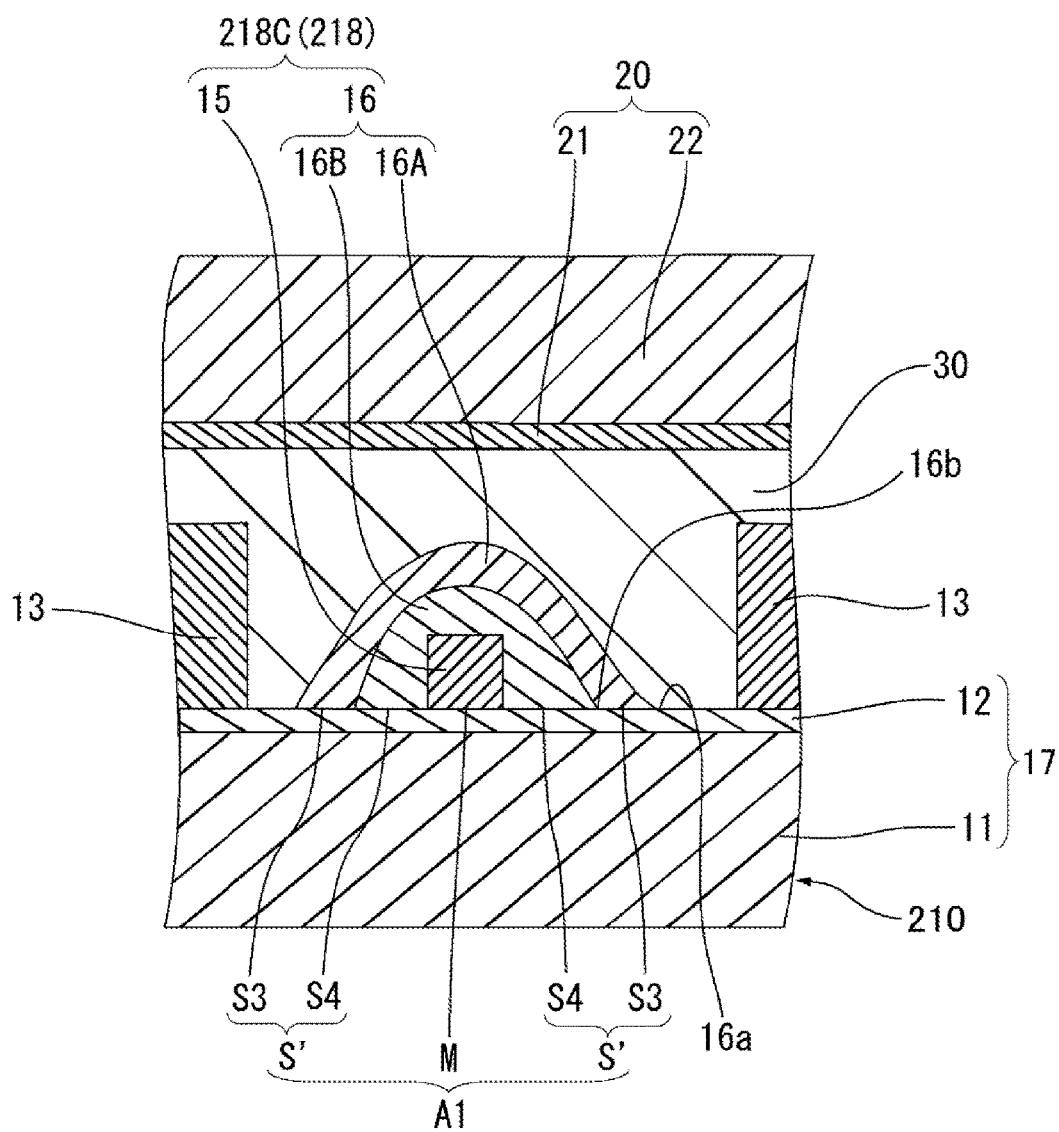
FIG. 7 is a partially magnified diagram of the photoelectric conversion element of FIG. 5.
Figure 8:
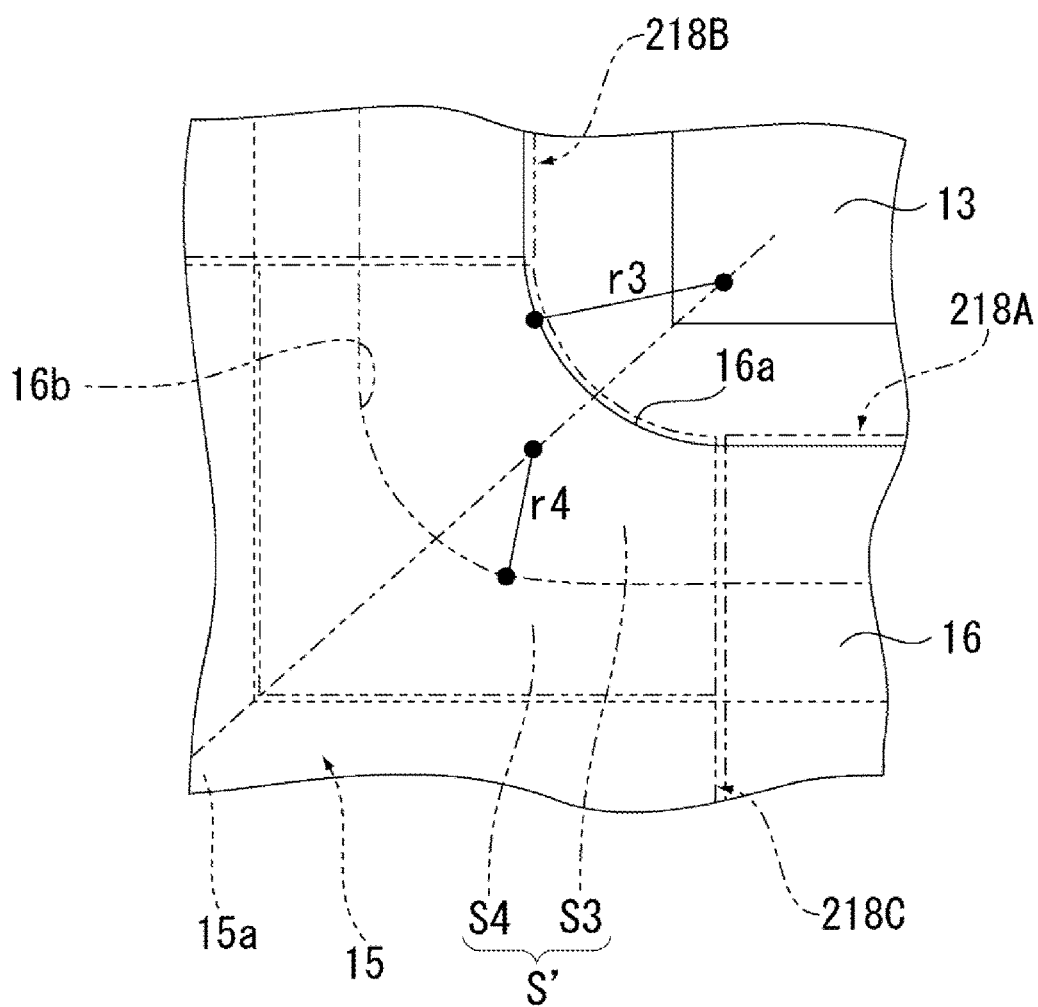
FIG. 8 is a partially magnified diagram of FIG. 6.

As illustrated in FIG. 7, the wiring section 218 includes a current-collecting wiring 15 provided on the transparent conductive film 12, and a wiring protective layer 16 that covers the current-collecting wiring 15 and thereby protects the current-collecting wiring from the electrolyte 30.

The wiring protective layer 16 includes a first wiring protective layer 16A and a second wiring protective layer 16B. The second wiring protective layer 16B covers and protects the current-collecting wiring 15, and the first wiring protective layer 16A is provided so as to intercept between the second wiring protective layer 16B and the electrolyte 30 and to thereby protect the second wiring protective layer 16B from the electrolyte 30.

A contact surface A1 between the connecting section 218C of the wiring section 218 and the conductive substrate 17 of the working electrode 210 includes a wiring contact surface M at which the current-collecting wiring 15 and the working electrode 210 are brought into contact; and protective layer contact surfaces S' that are adjacent to the wiring contact surface M. Also, each of the protective layer contacting surfaces S' is composed of a third surface S3 that is in contact with the transparent conductive film 12 of the working electrode 210 in the first wiring protective layer 16A, and a fourth surface S4 that is in contact with the transparent conductive film 12 of the working electrode 210 in the second wiring protective layer 16B. The fourth surface S4 is between the third surface S3 and the wiring contact surface M.

As illustrated in FIG. 8, the third surface S3 has a curved curve line 16a in the periphery that is a corner section that faces the porous oxide semiconductor layer 13. The fourth surface S4 has a boundary line 16b with the third surface S3.

Next, the operation and effect of the dye-sensitized solar cell 200 will be described.

In the dye-sensitized solar cell 200, the connecting section 218C of the wiring section 218 has a third surface S3 containing a curve line 16a in the periphery that faces the porous oxide semiconductor layer 13, at the contact surface A1 with the conductive substrate 17 of the working electrode 210. Therefore, even if stress is generated in the wiring section 218 as a result of a temperature change around the dye-sensitized solar cell 200, stress is concentrated on the connecting section 218C, and stress is concentrated on the third surface S3 in the contact surface A1 with the conductive substrate 17 at the connecting section 218C, since the periphery that faces the porous oxide semiconductor layer 13 in the third surface S3 is subjected to stress over the entirety of the curve line 16a, the stress applied to various points on the curve line 16a can be sufficiently dispersed. That is, since the third surface S3 is not subjected to stress on a point but is subjected to stress on a line, the stress at each point in the curve line 16a is decreased, and cracks starting from the points on the curve line 16a of the connecting section 218C are not likely to be generated. As a result, it is sufficiently suppressed that the electrolyte 30 penetrates through the cracks generated starting from the points on the curve line 16a and corrodes the current-collecting wiring 15. Therefore, the dye-sensitized solar cell 200 can have excellent durability.

Furthermore, in the dye-sensitized solar cell 200, the wiring protective layer 16 includes a first wiring protective layer 16A having the third surface S3; and a second wiring protective layer 16B, which has the fourth surface S4 between the third surface S3 of the first wiring protective layer 16A and the current-collecting wiring 15, at the contact surface A1 between the connecting section 218C and the conductive substrate 17. That is, the protective layer contact surface S' includes the third surface S3 as well as the fourth surface S4 between the third surface S3 and the current-collecting wiring 15. Therefore, even if cracks are generated in the third surface S3 of the first wiring protective layer 16A, the cracks can be stopped by the fourth surface S4. Therefore, penetration of the electrolyte 30 through cracks in the third surface S3 can be stopped by the second wiring protective layer 16B.

Next, the wiring protective layer 16 will be described in detail with reference to FIG. 7 and FIG. 8.

As illustrated in FIG. 7 and FIG. 8, the third surface S3 of the wiring protective layer 16 in the connecting section 218C is on the opposite side of the current-collecting wiring 15 with respect to the fourth surface S4, and the third surface S3 has a curve line 16a in the periphery that faces the porous oxide semiconductor layer 13. Therefore, a second curve line-containing surface is constructed by the third surface S3. Here, as illustrated in FIG. 8, the curve line 16a is approximately arc-shaped, and is convex toward the current-collecting wiring 15. The radius of curvature of the curve line 16a is designated as r3 (see FIG. 8).

The fourth surface S4 has a boundary line 16b with the third surface S3. Here, the boundary line 16b may be a curved curve line, or may be a non-curve line that is not curved. Here, the term non-curve line is intended to mean a line having a radius of curvature of 0.3 mm or less. In FIG. 8, the boundary line 16b forms a curve line. The curve line 16b is approximately arc-shaped, and is convex toward the current-collecting wiring 15. Here, the radius of curvature r4 of the line 16b of the fourth surface S4 may be smaller than the radius of curvature r3 of the curve line 16a of the third surface S3, or may be greater than or equal to the radius of curvature r3 of the curve line 16a; however, when the radius of curvature r4 is smaller than the radius of curvature r3 of the curve line 16a of the third surface S3, that is, when the radius of curvature r3 of the curve line 16a of the third surface S3 is greater than the radius of curvature r4 of the curve line 16b of the fourth surface S4, the present invention is particularly effective. In this case, the stress generated in the vicinity of the boundary line 16b in the fourth surface S4 of the second wiring protective layer 16B is dispersed over the entirety of the third surface S3 of the first wiring protective layer 16A, and the effect of suppressing the generation of cracks in the vicinity of the boundary line 16b of the fourth surface S4 is increased.

When the radius of curvature r4 of the boundary line 16b of the fourth surface S4 is smaller than the radius of curvature r3 of the curve line 16a of the third surface S3, it is preferable that the value of r3−r4 be 0.2 mm or more. In this case, the generation of cracks in the wiring protective layer 16 of the connecting section 218C can be effectively suppressed. The value of r3−r4 is more preferably 0.2 mm to 49.8 mm.

The radius of curvature r3 of the curve line 16a is desirably larger than 0.3 mm and smaller than or equal to 500 mm, but for the reason of effectively suppressing the generation of cracks in the vicinity of the line 16b of the fourth surface S4, the radius of curvature is preferably 0.5 mm or larger. However, for the reason that the distance between the curve line 16a and the porous oxide semiconductor layer 13 is increased, and thereby contamination of the porous oxide semiconductor layer 13 is prevented, the radius of curvature r3 of the curve line 16a is preferably 50 mm or less, and more preferably 30 mm or less.

The melting point (Tm3) of the first wiring protective layer 16A may be lower than, equal to, or higher than the melting point (Tm4) of the second wiring protective layer 16B, but is preferably lower than the melting point (Tm4). In the dye-sensitized solar cell 200, when stress is concentrated on the wiring protective layer 16 in the connecting section 218C, the first wiring protective layer 16A and the second wiring protective layer 16B are such that since the second wiring protective layer 16B has a longer circumference than the first wiring protective layer 16A, the absolute value of the amount of expansion in an environment in which temperature change occurs becomes larger, and thus stress is more likely to be concentrated. From that point of view, if the melting point of the first wiring protective layer 16A is lower than the melting point of the second wiring protective layer 16B, the first wiring protective layer 16A becomes softer than the second wiring protective layer 16B. Therefore, even if stress is concentrated on the connecting section 218C of the first wiring protective layer 16A, the stress is sufficiently mitigated by the first wiring protective layer 16A.

Here, for the reason of mitigating the stress in the connecting section 218C while maintaining the shape of the wiring protective layer 16, the value of Tm4−Tm3 is preferably 20° C. or higher, and more preferably 50° C. or higher. However, the value of Tm4−Tm3 is preferably 500° C. or lower.

Furthermore, the melting point (Tm3) of the first wiring protective layer 16A is usually 95° C. to 200° C., but for the reason that as the processing temperature of the first wiring protective layer 16A is lower, processing is made easier, the melting point is preferably 95° C. to 150° C., and more preferably 95° C. to 130° C.

The first wiring protective layer 16A and the second wiring protective layer 16B may be respectively formed of any one of a resin material and an inorganic material.

Examples of the resin material include thermoplastic resins such as modified polyolefins such as an ionomer, an ethylene-anhydrous vinyl acetate copolymer, an ethylene-methacrylic acid copolymer, and an ethylene-vinyl alcohol copolymer; ultraviolet-cured resins, and vinyl alcohol polymers. Meanwhile, in the case of using a resin material as the second wiring protective layer 16B, an epoxy resin can also be used in addition to the resins described above.

Examples of the inorganic material include inorganic insulating materials such as lead-free transparent low-melting point glass frit. Here, as the low-melting point glass frit, for example, one having a softening point of 150° C. to 550° C. can be used.

In the wiring protective layer 16, it is preferable that the first wiring protective layer 16A be formed of a resin material, and the second wiring protective layer 16B be formed of an inorganic material.

In this case, when stress is concentrated on the wiring protective layer 16 in the connecting section 218C, the first wiring protective layer 16A and the second wiring protective layer 16B are usually such that stress is more likely to be concentrated on the first wiring protective layer than on the second wiring protective layer 16B. From that point of view, when the first wiring protective layer 16A is formed of a resin material, and the second wiring protective layer 16B is formed of an inorganic material, the first wiring protective layer 16A becomes softer than the second wiring protective layer 16B. Therefore, even if stress is concentrated on the connecting section 218C of the first wiring protective layer 16A, the stress is sufficiently mitigated. In addition, since the second wiring protective layer 16B, which is a portion of the wiring protective layer 16C, is occupied by an inorganic material having higher sealing capability than resin materials, leakage of the electrolyte 30 is more sufficiently suppressed.

Next, the method for producing the dye-sensitized solar cell 200 will be explained.

The method for producing the dye-sensitized solar cell 200 is different from the method for producing the dye-sensitized solar cell 100 in the method for producing the working electrode 210. Thus, the method for producing the working electrode 210 will be explained.

First, the working electrode 210 is prepared. The working electrode 210 can be obtained as follows.

First, similarly to the method for producing the working electrode 10, a laminate is formed by forming a transparent conductive film 12 on a transparent substrate 11.

Next, a paste for porous oxide semiconductor layer formation is printed in each of plural regions on the transparent conductive film 12 obtained as described above.

Next, the paste for forming porous oxide semiconductor layer is calcined, and thus plural porous oxide semiconductor layers 13 are formed on the transparent conductive film 12.

Next, a current-collecting wiring 15 is formed on the transparent conductive film 12 of the conductive substrate 17. At this time, the current-collecting wiring 15 is formed so as to surround the plural porous oxide semiconductor layers 13.

The current-collecting wiring 15 can be obtained by, for example, mixing metal particles and a thickening agent such as polyethylene glycol to obtain a paste, coating the paste on the transparent conductive film 12 using a screen printing method or the like, and heating and calcining the paste.

The material that constitutes the current-collecting wiring 15 is desirably a metal, and as the metal, for example, silver is used.

Next, the current-collecting wiring 15 is covered with the second wiring protective layer 16B. At this time, the second wiring protective layer 16B completely covers the current-collecting wiring 15, and at the same time, is brought into contact with the conductive substrate 17. Meanwhile, when the boundary line 16b between the fourth surface S4 and the third surface S3 is formed into a curve line, a treatment such as described below may be carried out depending on the kind of the material that constitutes the second wiring protective layer 16B.

When an ultraviolet-cured resin is used as the second wiring protective layer 16B, it is desirable if an ultraviolet-curable resin which is a precursor of the ultraviolet-cured resin is applied on the current-collecting wiring 15 of the working electrode 210, the ultraviolet-curable resin is allowed to naturally flow until the periphery that faces the porous oxide semiconductor layer 13 at the contact surface between the ultraviolet-curable resin and the conductive substrate 17 acquires a curve line having a predetermined radius of curvature, and then the ultraviolet-curable resin is irradiated with ultraviolet radiation.

When a thermoplastic resin is used as the second wiring protective layer 16B, the thermoplastic resin may be fixed along onto the current-collecting wiring 15 of the working electrode 210 by heating and melting, and then heating of the thermoplastic resin may be continued until the periphery that faces the porous oxide semiconductor layer 13 in the contact surface between the thermoplastic resin and the conductive substrate 17 has a curve line having a predetermined radius of curvature.

When an inorganic insulating material such as low melting point glass frit is used as the second wiring protective layer 16B, a paste containing an inorganic insulating material may be applied on the current-collecting wiring 15 of the working electrode 210, subsequently the paste is allowed to naturally flow until the periphery that faces the porous oxide semiconductor layer 13 has a curve line having a predetermined radius of curvature, and then the paste may be calcined.

Next, the second wiring protective layer 16B is covered with the first wiring protective layer 16A. At this time, the first wiring protective layer 16A is brought into contact with the conductive substrate 17.

When a thermoplastic resin such as, for example, a modified polyolefin including an ionomer, an ethylene-anhydrous vinyl acetate copolymer, an ethylene-methacrylic acid copolymer, or an ethylene-vinyl alcohol copolymer is used as the first wiring protective layer 16A, for example, a resin sheet formed of a thermoplastic resin is prepared, and the resin sheet is fixed onto the second wiring protective layer 16B by heating and melting the resin sheet. Thereafter, heating of the thermoplastic resin may be continued until the periphery that faces the porous oxide semiconductor layer 13 in the third surface S3, which is a contact surface between the resin sheet and the conductive substrate 17, acquires a curve line having a predetermined radius of curvature.

For example, when an ultraviolet-cured resin is used as the first wiring protective layer 16A, for the first wiring protective layer 16A, an ultraviolet-curable resin which is a precursor of an ultraviolet-cured resin is applied on the second wiring protective layer 16B, and a cured product is formed by ultraviolet irradiation. Subsequently, an ultraviolet-curable resin may be applied using a dispenser on the periphery that faces the porous oxide semiconductor layer 13 in the third surface S3, which is a contact surface between the cured product and the conductive substrate 17, and then the ultraviolet-curable resin may be allowed to naturally flow until the corner sections acquire a curve line having a predetermined radius of curvature.

When an inorganic insulating material such as low melting point glass frit is used as the first wiring protective layer 16A, a paste containing an inorganic insulating material is applied on the second wiring protective layer 16B, the paste is allowed to naturally flow until the periphery that faces the porous oxide semiconductor layer 13 acquires a curve line having a predetermined radius of curvature, and then the paste may be calcined to form a calcination product.

Meanwhile, the radius of curvature of a curve line can be adjusted by appropriately selecting the temperature of the environment in which natural flowing is carried out, and time.

In this manner, the current-collecting wiring 15, the second wiring protective layer 16B and the first wiring protective layer 16A are sequentially formed on the conductive substrate 17, and thus the wiring section 218 is formed. At this time, the wiring section 218 is composed of a plurality of linear sections 218A, a plurality of linear sections 218B, and a connecting section 218C that connects these linear sections. Here, the contact surface between the current-collecting wiring 15 and the transparent conductive film 12 becomes a wiring contact surface M, and the contact surface at which the second wiring protective layer 16B is in contact with the conductive substrate 17 becomes the fourth surface S4. Also, the contact surface at which the first wiring protective layer 16A is brought into contact with the conductive substrate 17 becomes the third surface S3.

The working electrode 210 can be obtained as described above.

Figure 9:
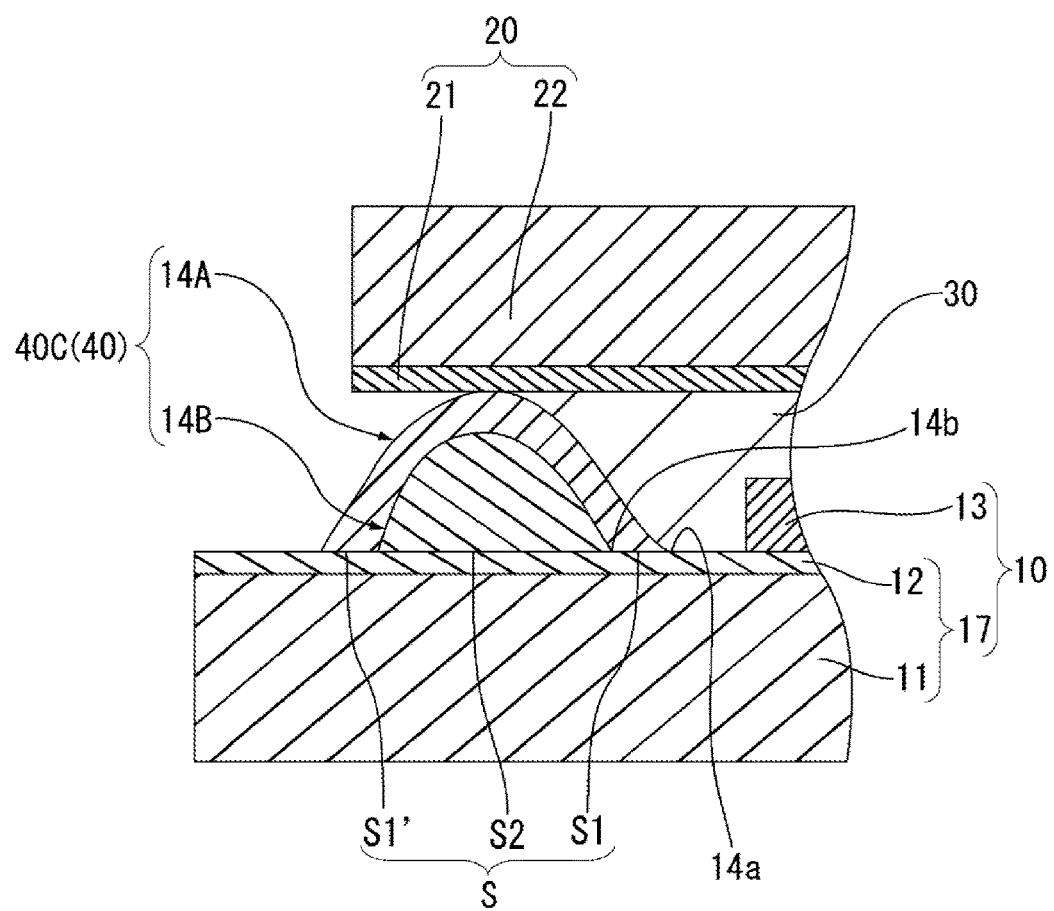
FIG. 9 is a partial cross-sectional diagram illustrating a first modification example of the sealing section of FIG. 1.

The present invention is not intended to be limited to the first and second embodiments. For example, in the first and second embodiments, the first sealing section 14A covers only the region on the electrolyte 30 side and the region that faces the counter electrode 20 in the second sealing section 14B; however, the first sealing section 14A may cover the entirety of the second sealing section 14B as illustrated in FIG. 9. That is, the first sealing section 14A may also cover the region on the opposite side of the electrolyte 30 in the second sealing section 14B. In this case, the first sealing section 14A also covers the surface on the opposite side of the electrolyte 30 with respect to the second sealing section 14B, in the surface of the working electrode 10. Therefore, the contact surface S at the corner sections 40C with the working electrode 10 is composed of a first surface S1, a second surface S2 provided on the opposite side of the electrolyte 30 with respect to the first surface S1, and a surface S1' provided on the opposite side of the electrolyte 30 with respect to the second surface S2.

Furthermore, in the first and second embodiment, the first sealing section 14A connects the second sealing section 14B with the counter electrode 20; however, the first sealing section 14A may not necessarily connect the second sealing section 14B with the counter electrode 20. That is, the first sealing section 14A may connect the working electrode 10 with the counter electrode 20, or may connect the second sealing section 14B or the working electrode 10 or 210 with the counter electrode 20.

Furthermore, in the first and second embodiments, the first sealing section 14A is provided so as to intercept between the second sealing section 14B and the electrolyte 30, but the first sealing section 14A may not be provided to intercept between the second sealing section 14B and the electrolyte 30. Therefore, the second sealing section 14B may be in contact with the electrolyte 30.

Furthermore, in the first and second embodiments, the sealing section 40 has four corner sections 40C, but it is acceptable for the sealing section to have at least one corner section.

Figure 10:
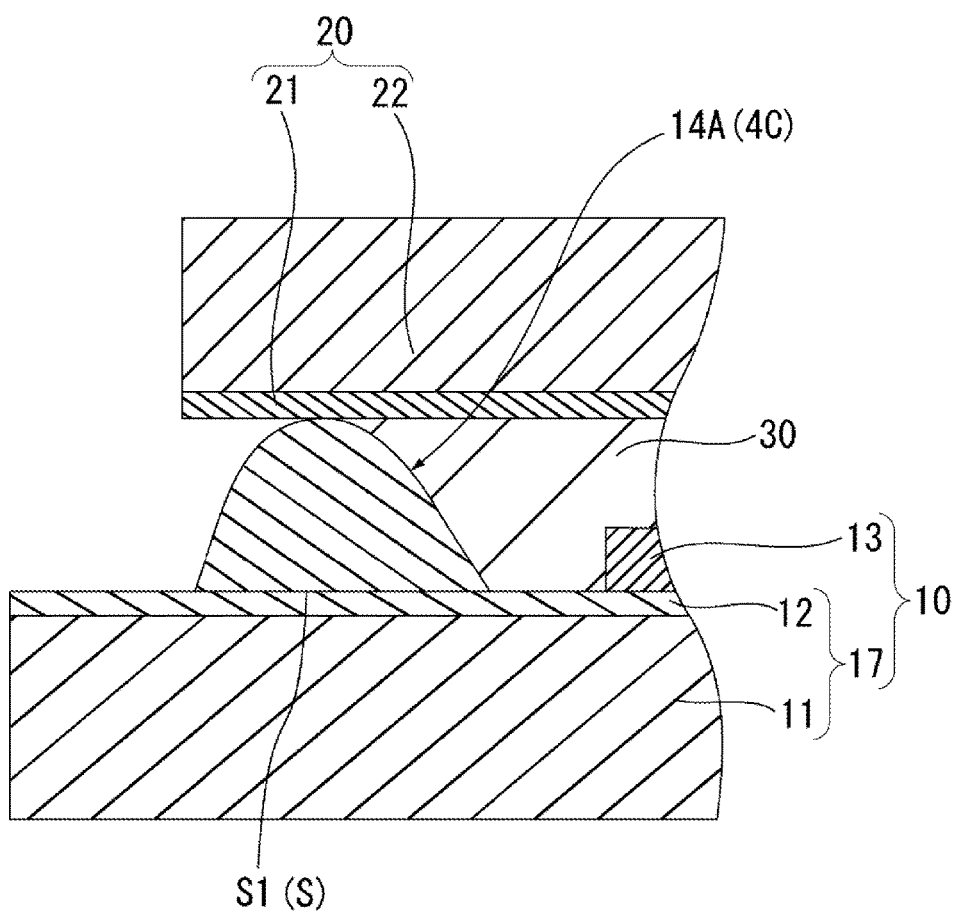
FIG. 10 is a partial cross-sectional diagram illustrating a second modification example of the sealing section of FIG. 1.

Furthermore, in the first and second embodiments, the sealing section 40 is composed of the first sealing section 14A and the second sealing section 14B, but the sealing section 40 may be composed only of the first sealing section 14A, as illustrated in FIG. 10.

Also, in the first embodiment, a thermoplastic resin is used as the first sealing section forming material, but instead of the thermoplastic resin, an ultraviolet-cured resin or an inorganic insulating material such as low melting point glass frit can also be used.

When an ultraviolet-curable resin is used as the first sealing section forming material, the ultraviolet-curable resin is fixed respectively on the second annular area of the counter electrode 20 and the second sealing section forming material fixed on the working electrode 10, or only on the second sealing section forming material fixed on the working electrode 10. In this case, regarding the first sealing section forming material, when an ultraviolet-curable resin is formed on the second annular area or the second sealing section forming material by a drawing method, the ultraviolet-curable resin formed at the corner sections is intentionally increased by decreasing the rate of drawing when the corner sections are drawn, or the like, and the ultraviolet-curable resin may be allowed to naturally flow until the line that is in contact with the working electrode 10 or 210 in the inner circumferential surface of the corner sections of the applied paste becomes a curve line having a predetermined radius of curvature.

When an inorganic insulating material such as low melting point glass frit is used as the first sealing section forming material, the inorganic insulating material is fixed respectively on the second annular area of the counter electrode 20 and the second sealing section forming material fixed on the working electrode 10, or only on the second sealing section forming material fixed on the working electrode 10. In this case, the inorganic insulating material may be fixed on the second annular area or the second sealing section forming material in the same manner as in the case of using an inorganic insulating material as the second sealing section forming material.

Figure 11:
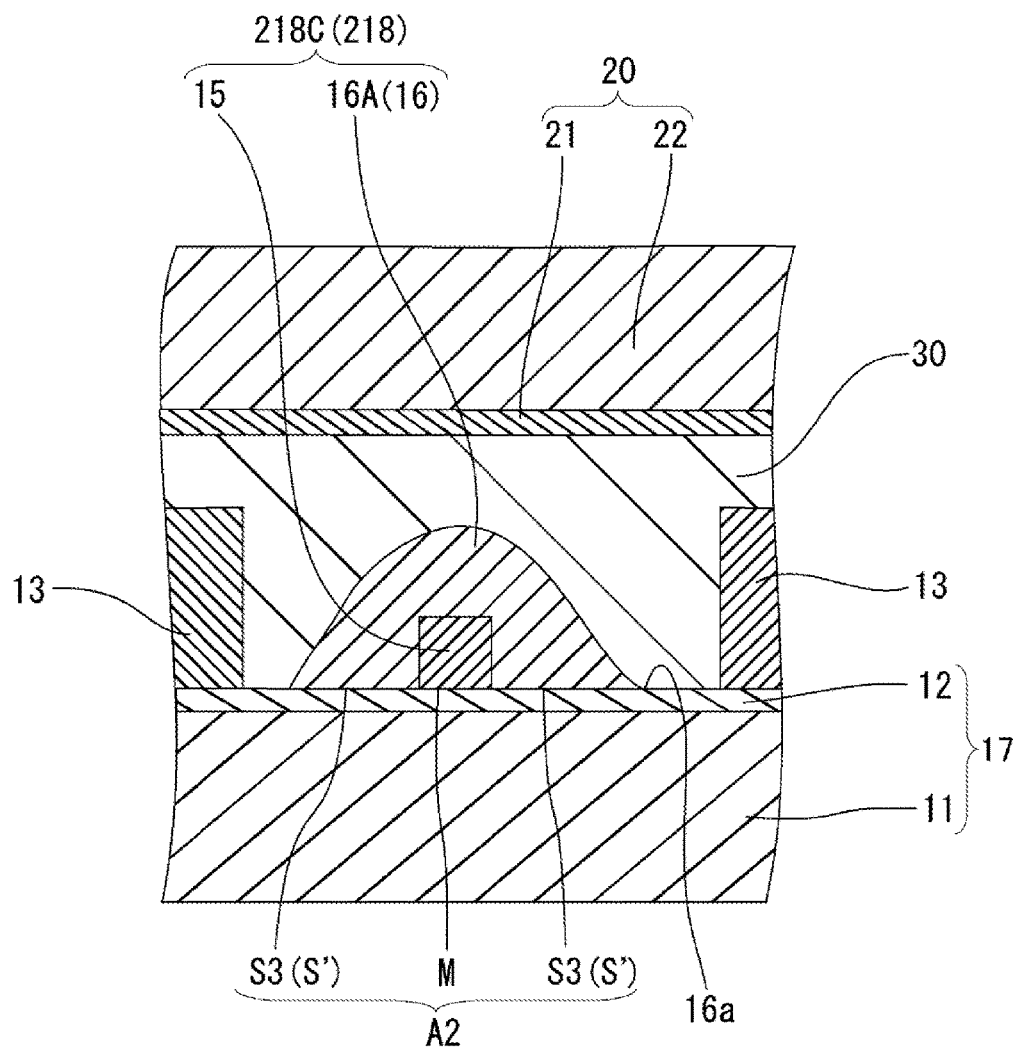
FIG. 11 is a partial cross-sectional diagram illustrating a modification example of the wiring section of FIG. 5.

Furthermore, in the second embodiment, the wiring protective layer 16 is composed of the first wiring protective layer 16A and the second wiring protective layer 16B, but the wiring protective layer 16 may be composed only of the first wiring protective layer 16A, as illustrated in FIG. 11. In this case, the contact surface A2 between the connecting section 218C and the conductive substrate 17 is composed of a wiring contact surface M and a third surface S3 of the first wiring protective layer 16A.

Furthermore, in the second embodiment, the third surface S3 has a curved curve line 16a in the periphery that faces the porous oxide semiconductor layer 13, but the third surface S3 may not necessarily have a curved curve line 16a in the periphery that faces the porous oxide semiconductor layer 13. That is, the third surface S3 may have a non-curve line in the periphery that faces the porous oxide semiconductor layer 13.

Furthermore, in the first and second embodiment, the case in which the photoelectric conversion element is a dye-sensitized solar cell is described, but the present invention is applicable to photoelectric conversion elements that encapsulate an electrolyte therein, regardless of a liquid, a solid or a gel. Therefore, the present invention is also applicable to, for example, organic thin film solar cells.

EXAMPLES

Hereinafter, the subject matter of the present invention will be described more specifically by way of Examples, but the present invention is not intended to be limited to the Examples described below.

Example 1

First, an FTO substrate having a dimension of 10 cm×10 cm×4 mm and obtained by forming an FTO film on a glass substrate was prepared. Subsequently, a titanium oxide paste (manufactured by Solaronix SA, Ti nanoixide T/sp) was applied on the FTO substrate by a doctor blade method to a thickness of 10 µm, and then the FTO substrate was placed in a hot air circulation type oven and calcined for 3 hours at 500° C. Thus, one porous oxide semiconductor layer having a dimension of 4.5 cm×4.5 cm×10 µm was formed on the FTO substrate, and thus a working electrode was obtained.

On the other hand, a counter electrode substrate formed from titanium and having a dimension of 6 cm×6 cm×2 mm was prepared. Then, a platinum catalyst layer having a thickness of 10 nm was formed on the counter electrode substrate by a sputtering method, and thus a counter electrode was obtained.

In this manner, a working electrode and a counter electrode were prepared.

Next, a quadrilateral annular resin sheet was prepared, which measured 6 cm×6 cm×100 µm and was formed of an ethylene-methacrylic acid copolymer, NUCREL (manufactured by DuPont Mitsui Polychemicals Co., Ltd., melting point: 98° C.), and in which an opening measuring 5 cm×5 cm×100 µm was formed at the center of the sheet. Then, this resin sheet was disposed at the first annular area that surrounded the porous oxide semiconductor layer of the working electrode. Subsequently, this resin sheet was heated to melt for 5 minutes at 180° C., and thereby the radius of curvature of the line on the inner circumference side (porous oxide semiconductor layer side) at the contact surface between the corner sections of the resin sheet and the working electrode was adjusted to be 2 mm. The resin sheet was adhered to the first annular area, and the first sealing section forming material was fixed to the first annular area at the FTO substrate.

Next, this working electrode was immersed for one whole day and night in a dehydrated ethanol solution having N719 dye, which is a photosensitizing dye, dissolved therein at 0.2 mM. Thus, a photosensitizing dye was supported on the working electrode.

On the other hand, a quadrilateral annular resin sheet was prepared, which was formed of NUCREL and measured 6 cm×6 cm×100 µm, and in which an opening measuring 5 cm×5 cm×100 µm was formed at the center of the sheet. Then, this resin sheet was disposed at the second annular area of the counter electrode. Subsequently, this resin sheet was heated to melt for 5 minutes at 180° C., and thereby the radius of curvature of the line on the inner circumference side at the contact surface between the corner sections of the resin sheet and the counter electrode was adjusted to be 2 mm. The resin sheet was adhered to the second annular area, and the first sealing section forming material was fixed to the second annular area at the counter electrode.

Subsequently, the working electrode having the first sealing section forming material fixed thereon was disposed such that the surface on the porous oxide semiconductor layer side of the FTO substrate would be horizontal, and a volatile electrolyte containing a volatile solvent formed of methoxyacetonitrile as a main solvent, 0.1 M lithium iodide, 0.05 M iodine and 0.5 M 4-tert-butylpyridine, was poured into the inner side of the first sealing section forming material.

Next, the counter electrode having the first sealing section forming material fixed thereon was arranged to face the working electrode, and the first sealing section forming material on the working electrode and the first sealing section forming material on the counter electrode were superimposed at atmospheric pressure. Then, the first sealing section forming materials were heated to melt at 148° C. while pressure was applied at 5 MPa, with the counter electrode interposed therebetween, using a pressing machine at atmospheric pressure, and thus a sealing section composed of the first sealing section was obtained. In this manner, a dye-sensitized solar cell was obtained. Meanwhile, in the dye-sensitized solar cell thus obtained, the radius of curvature of the curve line on the electrolyte side at the contact surface of the corner sections of the first sealing section with the working electrode was adjusted as indicated in Table 1.

Example 2

A dye-sensitized solar cell was produced in the same manner as in Example 1, except that the first sealing section forming material was changed from NUCREL to an ionomer, HIMILAN (trade name, manufactured by DuPont Mitsui Polychemicals Co., Ltd., melting point: 98° C.), and the radius of curvature of the curve line on the electrolyte side at the contact surface of the corner sections of the first sealing section with the working electrode was adjusted as indicated in Table 1.

Example 3

First, a working electrode and a counter electrode were prepared in the same manner as in Example 1.

Next, a quadrilateral annular resin sheet was prepared, which was formed of NUCREL and measured 6 cm×6 cm×100 µm, and in which an opening measuring 5 cm×5 cm×100 µm was formed at the center of the sheet. Then, this resin sheet was disposed at the first annular area that surrounded the porous oxide semiconductor layer of the working electrode. Subsequently, this resin sheet was heated to melt for 5 minutes at 180° C., and thereby the radius of curvature of the line on the inner circumference side (porous oxide semiconductor layer side) at the contact surface between the corner sections of the resin sheet and the working electrode was adjusted to be 0.3 mm or less. The resin sheet was adhered to the annular area, and the second sealing section forming material was fixed to the first annular area at the FTO substrate.

Next, a photosensitizing dye was supported on this working electrode in the same manner as in Example 1.

On the other hand, a quadrilateral annular resin sheet was prepared, which was formed of an ethylene-anhydrous vinyl acetate copolymer, BYNEL (manufactured by DuPont Co., melting point: 127° C.), and measured 6 cm×6 cm×100 µm, and in which an opening measuring 4.8 cm×4.8 cm×100 µm was formed at the center of the sheet. Then, this resin sheet was disposed at the second annular area of the counter electrode. Subsequently, this resin sheet was heated to melt for 5 minutes at 180° C., and thereby the radius of curvature of the line on the inner circumference side at the contact surface between the corner sections of the resin sheet and the counter electrode was adjusted to be 2 mm. The resin sheet was adhered to the second annular area, and the first sealing section forming material was fixed to the second annular area at the counter electrode.

Subsequently, the working electrode having the second sealing section forming material fixed thereon was disposed such that the surface on the porous oxide semiconductor layer side of the FTO substrate would be horizontal, and a volatile electrolyte containing a volatile solvent formed of methoxyacetonitrile as a main solvent, 0.1 M lithium iodide, 0.05 M iodine and 0.5 M 4-tert-butylpyridine, was poured into the inner side of the first sealing section forming material.

Next, the counter electrode having the first sealing section forming material fixed thereon was arranged to face the working electrode having the second sealing section forming material fixed thereon, and the first sealing section forming material and the second sealing section forming material were superimposed at atmospheric pressure. Then, the first sealing section forming material and the second sealing section forming material were heated to melt at 148° C. while pressure was applied at 5 MPa, with the counter electrode interposed therebetween, using a pressing machine at atmospheric pressure. At this time, the first sealing section forming material melted, and the viscosity of the first sealing section forming material decreased, so that the region on the electrolyte side and the region facing the counter electrode of the second sealing section were covered with the first sealing section forming material. Furthermore, the first sealing section forming material was brought into contact with a portion of the transparent conductive film in the working electrode. In this manner, the sealing section was formed, and thus a dye-sensitized solar cell was obtained.

Meanwhile, in the dye-sensitized solar cell thus obtained, the radius of curvature of the curve line on the electrode side at the contact surface of the corner sections of the first sealing section with the working electrode (hereinafter, simply referred to as "radius of curvature of the curve line of the first sealing section"), and the radius of curvature of the line on the electrolyte side at the contact surface of the corner sections of the second sealing section with the working electrode (hereinafter, simply referred to as "radius of curvature of the line on the electrolyte side of the second sealing section") were adjusted as indicated in Table 1.

Example 4

A dye-sensitized solar cell was obtained in the same manner as in Example 3, except that the material that constituted the resin sheet for forming the second sealing section forming material was changed from NUCREL to HIMILAN, and the radius of curvature of the curve line of the first sealing section and the radius of curvature of the line on the electrolyte side of the second sealing section were changed as indicated in Table 1.

Example 5

A dye-sensitized solar cell was obtained in the same manner as in Example 3, except that the material that constituted the resin sheet for forming the first sealing section forming material was changed from BYNEL to NUCREL, the material that constituted the resin sheet for forming the second sealing section forming material was changed from NUCREL to BYNEL, and the radius of curvature of the curve line of the first sealing section and the radius of curvature of the line on the electrolyte side of the second sealing section were changed as indicated in Table 1.

Example 6

A dye-sensitized solar cell was obtained in the same manner as in Example 3, except that the material that constituted the resin sheet for forming the first sealing section forming material was changed from BYNEL to HIMILAN, the material that constituted the resin sheet for forming the second sealing section forming material was changed from NUCREL to BYNEL, and the radius of curvature of the curve line of the first sealing section and the radius of curvature of the line on the electrolyte side of the second sealing section were changed as indicated in Table 1.

Example 7

A dye-sensitized solar cell was obtained in the same manner as in Example 3, except that the material that constituted the resin sheet for forming the first sealing section forming material was changed from BYNEL to HIMILAN, the radius of curvature of the curve line of the first sealing section and the radius of curvature of the line on the electrolyte side of the second sealing section were changed as indicated in Table 1, and the second sealing section forming material was fixed at the first annular area of the working electrode in the following manner.

That is, an epoxy resin (MAXIVE, manufactured by Mitsubishi Gas Chemical Co., Inc., temperature at which scorching occurs: 320° C.) was applied on the first annular area of the working electrode using a dispenser, and the working electrode was left to stand in an environment at 30° C. Then, natural flowing of the epoxy resin was awaited, and then the radius of curvature of the line on the inner circumference side (porous oxide semiconductor layer side) at the contact surface between the corner sections of the cured product and the working electrode was adjusted to be 0.3 mm or less by adjusting the ambient temperature to 100° C. The epoxy resin was cured, and thus a quadrilateral annular cured product was formed. In this manner, the second sealing section forming material formed from the cured product was fixed to the first annular area at the FTO substrate.

Example 8

A dye-sensitized solar cell was obtained in the same manner as in Example 7, except that the material that constituted the resin sheet for forming the first sealing section forming material was changed from HIMILAN to NUCREL, and the radius of curvature of the curve line of the first sealing section and the radius of curvature of the line on the electrolyte side of the second sealing section were changed as indicated in Table 1.

Example 9

A dye-sensitized solar cell was obtained in the same manner as in Example 7, except that the material that constituted the resin sheet for forming the first sealing section forming material was changed from HIMILAN to BYNEL, and the radius of curvature of the curve line of the first sealing section and the radius of curvature of the line on the electrolyte side of the second sealing section were changed as indicated in Table 1.

Example 10

First, a working electrode and a counter electrode were prepared in the same manner as in Example 1.

Next, a paste containing a low melting point glass frit (NP-7095E manufactured by Noritake Co., Ltd., melting point (softening point): 450° C.) was printed on the first annular area surrounding the porous oxide semiconductor layer of the working electrode using a screen printing method, and the paste was calcined by heating for 4 hours at 460° C. Thus, a quadrilateral annular calcination product was formed. Thus, a calcination product without sagging was obtained by bringing the softening temperature and the calcination temperature closer to each other. In this manner, the radius of curvature of the line on the inner circumference side (porous oxide semiconductor layer side) at the contact surface between the corner sections of the calcination product and the working electrode was adjusted to 0.3 mm or less, and the second sealing section forming material was fixed to the first annular area on the FTO substrate.

Next, a photosensitizing dye was supported on this working electrode in the same manner as in Example 1.

Next, an ultraviolet-curable resin, 31x-101 (manufactured by ThreeBond Group, temperature at which scorching occurs: 200° C.), was printed on the second sealing section forming material using a screen printing method such that the radius of curvature of the line on the inner circumference side (porous oxide semiconductor layer side) at the contact surface between the corner sections and the working electrode would be 0.5 mm. Thus, a first sealing section forming material formed of a quadrilateral annular ultraviolet-curable resin was fixed. In this manner, the first sealing section forming material was fixed onto the second sealing section forming material.

Subsequently, the working electrode having the second sealing section forming material and the first sealing section forming material sequentially fixed thereon was disposed such that the surface on the porous oxide semiconductor layer side of the FTO substrate would be horizontal. A volatile electrolyte containing a volatile solvent formed of methoxyacetonitrile as a main solvent, 0.1 M lithium iodide, 0.05 M iodine and 0.5 M 4-tert-butylpyridine, was poured on the inner side of the first sealing section forming material.

Next, the counter electrode was arranged to face the working electrode having the second sealing section forming material and the first sealing section forming material fixed thereon, and the first sealing section forming material and the counter electrode were superimposed at atmospheric pressure. Then, the first sealing section forming material was irradiated with ultraviolet radiation for 30 seconds using a low pressure mercury lamp at atmospheric pressure to cure the first sealing section forming material, and the ultraviolet-cured resin, which was a cured product of the first sealing section forming material, was adhered to the counter electrode to obtain a sealing section. At this time, the first sealing section forming material became the first sealing section, and the second sealing section forming material became the second sealing section. In this manner, a dye-sensitized solar cell was obtained. Meanwhile, in the dye-sensitized solar cell thus obtained, the radius of curvature of the curve line of the first sealing section and the radius of curvature of the line on the electrolyte side of the second sealing section were adjusted as indicated in Table 1.

Example 11

A dye-sensitized solar cell was obtained in the same manner as in Example 10, except that the first sealing section forming material was changed from 31x-101 to HIMILAN, the radius of curvature of the curve line of the first sealing section and the radius of curvature of the line on the electrolyte side of the second sealing section were changed as indicated in Table 1, and the first sealing section forming material was fixed to the second annular area in the counter electrode in the following manner.

That is, a quadrilateral annular resin sheet was prepared, which was formed of HIMILAN and measured 6 cm×6 cm×100 μm, and in which an opening measuring 4.8 cm×4.8 cm×100 μm was formed at the center of the sheet. Then, this resin sheet was disposed at the second annular area of the counter electrode. Subsequently, this resin sheet was heated to melt for 5 minutes at 180° C., and thereby the radius of curvature of the line on the inner circumference side at the contact surface between the corner sections of the resin sheet and the counter electrode was adjusted to be 0.5 mm. The resin sheet was adhered to the second annular area. In this manner, the first sealing section forming material was fixed to the second annular area in the counter electrode.

Example 12

A dye-sensitized solar cell was obtained in the same manner as in Example 10, except that the first sealing section forming material was changed from 31x-101 to NUCREL, the radius of curvature of the curve line of the first sealing section and the radius of curvature of the line on the electrolyte side of the second sealing section were changed as indicated in Table 1, and the first sealing section forming material was fixed to the second annular area in the counter electrode in the following manner.

That is, a quadrilateral annular resin sheet was prepared, which was formed of NUCREL and measured 6 cm×6 cm×100 μm, and in which an opening measuring 4.8 cm×4.8 cm×100 μm was formed at the center of the sheet. Then, this resin sheet was disposed at the second annular area of the counter electrode. Subsequently, this resin sheet was heated to melt for 5 minutes at 180° C., and thereby the radius of curvature of the line on the inner circumference side at the contact surface between the corner sections of the resin sheet and the counter electrode was adjusted to be 0.5 mm. The resin sheet was adhered to the second annular area. In this manner, the first sealing section forming material was fixed to the second annular area in the counter electrode.

Example 13

A dye-sensitized solar cell was obtained in the same manner as in Example 10, except that the first sealing section forming material was changed from 31x-101 to BYNEL, the first sealing section forming material was fixed to the second annular area in the counter electrode in the manner described below, and the radius of curvature of the curve line of the first sealing section and the radius of curvature of the line on the electrolyte side of the second sealing section were changed as indicated in Table 1.

That is, a quadrilateral annular resin sheet was prepared, which was formed of BYNEL and measured 6 cm×6 cm×100 μm, and in which an opening measuring 4.8 cm×4.8 cm×100 μm was formed at the center of the sheet. Then, this resin sheet was disposed at the second annular area of the counter electrode. Subsequently, this resin sheet was heated to melt for 5 minutes at 180° C., and thereby the radius of curvature of the line on the inner circumference side at the contact surface between the corner sections of the resin sheet and the counter electrode was adjusted to be 0.5 mm. The resin sheet was adhered to the second annular area. In this manner, the first sealing section forming material was fixed to the second annular area in the counter electrode.

Example 14

A dye-sensitized solar cell was obtained in the same manner as in Example 10, except that the radius of curvature of the curve line of the first sealing section and the radius of curvature of the line on the electrolyte side of the second sealing section were changed as indicated in Table 1.

Example 15

A dye-sensitized solar cell was obtained in the same manner as in Example 10, except that the first sealing section forming material was changed from 31x-101 to NUCREL, the radius of curvature of the curve line of the first sealing section and the radius of curvature of the line on the electrolyte side of the second sealing section were changed as indicated in Table 1, and the first sealing section forming material was fixed to the second annular area in the counter electrode in the following manner.

That is, a quadrilateral annular resin sheet was prepared, which was formed of NUCREL and measured 6 cm×6 cm×100 μm, and in which an opening measuring 4.8 cm×4.8 cm×100 μm was formed at the center of the sheet. Then, this resin sheet was disposed at the second annular area of the counter electrode. Subsequently, this resin sheet was heated to melt for 5 minutes at 180° C., and thereby the radius of curvature of the line on the inner circumference side at the contact surface between the corner sections of the resin sheet and the counter electrode was adjusted to be 2 mm. The resin sheet was adhered to the second annular area. In this manner, the first sealing section forming material was fixed to the second annular area in the counter electrode.

Example 16

A dye-sensitized solar cell was obtained in the same manner as in Example 10, except that the first sealing section forming material was changed from 31x-101 to BYNEL, the radius of curvature of the curve line of the first sealing section and the radius of curvature of the line on the electrolyte side of the second sealing section were changed as indicated in Table 1, and the first sealing section forming material was fixed to the second annular area in the counter electrode in the following manner.

That is, a quadrilateral annular resin sheet was prepared, which was formed of BYNEL and measured 6 cm×6 cm×100 μm, and in which an opening measuring 4.8 cm×4.8 cm×100 μm was formed at the center of the sheet. Then, this resin sheet was disposed at the second annular area of the counter electrode. Subsequently, this resin sheet was heated to melt for 5 minutes at 180° C., and thereby the radius of curvature of the line on the inner circumference side at the contact surface between the corner sections of the resin sheet and the counter electrode was adjusted to be 2.5 mm. The resin sheet was adhered to the second annular area. In this manner, the first sealing section forming material was fixed to the second annular area in the counter electrode.

Example 17

A dye-sensitized solar cell was obtained in the same manner as in Example 16, except that the radius of curvature of the curve line of the first sealing section was adjusted to 5 mm.

Example 18

A dye-sensitized solar cell was obtained in the same manner as in Example 10, except that the radius of curvature of the curve line of the first sealing section was adjusted to 2 mm, the first sealing section was brought into contact respectively with the surface on the electrolyte side and the surface on the opposite side (outer side) of the electrolyte with respect to the second surface of the second sealing section in the surface of the working electrode by making the first sealing section completely cover the second sealing section, and also, the radius of curvature of the line on the electrolyte side of the second sealing section was adjusted to 1 mm.

Example 19

A dye-sensitized solar cell was obtained in the same manner as in Example 11, except that the radius of curvature of the curve line of the first sealing section was adjusted to 2 mm, the first sealing section was brought into contact respectively with the surface on the electrolyte side and the surface on the opposite side (outer side) of the electrolyte with respect to the second surface of the second sealing section in the surface of the working electrode by making the first sealing section completely cover the second sealing section, and also, the radius of curvature of the line on the electrolyte side of the second sealing section was adjusted to 1 mm.

Example 20

A dye-sensitized solar cell was obtained in the same manner as in Example 12, except that the radius of curvature of the curve line of the first sealing section was adjusted to 2 mm, the first sealing section was brought into contact respectively with the surface on the electrolyte side and the surface on the opposite side (outer side) of the electrolyte with respect to the second surface of the second sealing section in the surface of the working electrode by making the first sealing section completely cover the second sealing section, and also, the radius of curvature of the line on the electrolyte side of the second sealing section was adjusted to 1 mm.

Example 21

A dye-sensitized solar cell was obtained in the same manner as in Example 13, except that the radius of curvature of the curve line of the first sealing section was adjusted to 2 mm, the first sealing section was brought into contact respectively with the surface on the electrolyte side and the surface on the opposite side (outer side) of the electrolyte with respect to the second surface of the second sealing section in the surface of the working electrode by making the first sealing section completely cover the second sealing section, and also, the radius of curvature of the line on the electrolyte side of the second sealing section was adjusted to 1 mm.

Comparative Example 1

A dye-sensitized solar cell was obtained in the same manner as in Example 10, except that the first sealing section forming material was not fixed onto the second sealing section forming material, and the sealing section was composed only of a second sealing section formed of glass frit.

Comparative Example 2

A dye-sensitized solar cell was obtained in the same manner as in Example 7, except that the first sealing section forming material was not fixed to the second annular area of the counter electrode, and the sealing section was composed only of a second sealing section formed of an epoxy resin.

Example 22

First, an FTO substrate measuring 10 cm×10 cm×4 mm was prepared. Subsequently, a titanium oxide paste (manufactured by Solaronix SA, Ti nanoixide T/sp) was applied at 16 sites on the FTO substrate by a doctor blade method to a thickness of 10 µm, and then the FTO substrate was placed in a hot air circulation type oven and calcined for 3 hours at 500° C. Thus, sixteen porous oxide semiconductor layers were formed on the FTO substrate. The dimension of each of the porous oxide semiconductor layers was 19.5 mm×19.5 mm×10 µm.

Then, a silver paste formed by mixing silver particles and ethyl cellulose was applied so as to surround the respective porous oxide semiconductor layers, and then the silver paste was calcined for one hour at 500° C. Thus, a lattice-shaped current-collecting wiring which measured 1 mm in width and 10 µm in thickness and had sixteen quadrilateral openings each measuring 23 mm×23 mm, was formed.

Next, a paste containing a low melting point glass frit (NP-7095E manufactured by Noritake Co., Ltd., melting point (softening point): 450° C.) was printed on the current-collecting wiring using a screen printing method, and the paste was heated and calcined for 4 hours at 460° C. Thus, a calcination product was formed. At this time, the radius of curvature of the line in the periphery that faced the porous oxide semiconductor layer at the contact surface between the connecting sections of the calcination product and the FTO substrate was adjusted to be 1 mm. In this manner, a second wiring protective layer was formed on the current-collecting wiring provided on the FTO substrate.

Subsequently, a lattice-shaped resin sheet in which sixteen quadrilateral openings each having a dimension of 21 mm×21 mm×100 µm were formed on a resin sheet which was formed of HIMILAN and had a dimension of 10 cm×10 cm×100 µm, was prepared. Then, this resin sheet was disposed on the second wiring protective layer, and was heated to melt for 5 minutes at 180° C. so as to completely cover the second wiring protective layer. At this time, heating of the resin sheet was continued until the radius of curvature of the periphery that faced the porous oxide semiconductor layer at the contact surface of the connecting sections of the resin sheet with the FTO substrate would be 2 mm. Thus, the resin sheet was allowed to naturally flow. In this manner, a wiring section was formed on the FTO substrate, and thus a working electrode was obtained.

On the other hand, a counter electrode substrate formed of titanium and measuring 10 cm×10 cm×2 mm was prepared. Then, a platinum catalyst layer having a thickness of 10 nm was formed on the counter substrate by a sputtering method. In this manner, a counter electrode was obtained.

Next, a quadrilateral annular resin sheet was prepared, which was formed of an ethylene-methacrylic acid copolymer, NUCREL (manufactured by DuPont Mitsui Polychemicals Co., Ltd., melting point: 98° C.), and measured 10 cm×10 cm×100 µm, and in which an opening measuring 9.8 cm×9.8 cm×100 µm was formed at the center of the sheet. Then, this resin sheet was disposed at the first annular area surrounding the porous oxide semiconductor layer of the working electrode. This resin sheet was heated to melt for 5 minutes at 180° C., and thereby the radius of curvature of the line on the inner circumference side (porous oxide semiconductor layer side) at the contact surface between the corner sections of the resin sheet and the working electrode was adjusted to be 2 mm. The resin sheet was adhered to the first annular area, and thus the first sealing section forming material was fixed to the first annular area in the FTO substrate.

Next, this working electrode was immersed for one whole day and night in a dehydrated ethanol solution in which a photosensitizing dye, N719 dye, was dissolved at 0.2 mM, and thus the photosensitizing dye was supported on the working electrode.

On the other hand, a quadrilateral annular resin sheet was prepared, which was formed of NUCREL and measured 10 cm×10 cm×100 µm, and in which an opening measuring 9.8 cm×9.8 cm×100 µm was formed at the center of the sheet. Then, this resin sheet was disposed at the second annular area of the counter electrode. This resin sheet was heated to melt for 5 minutes at 180° C., and thereby the radius of curvature of the line on the inner circumference side at the contact surface between the corner sections of the resin sheet and the counter electrode was adjusted to be 2 mm. The resin sheet was adhered to the second annular area, and the first sealing section forming material was fixed to the second annular area at the counter electrode.

Subsequently, the working electrode was disposed such that the surface on the porous oxide semiconductor layer side of the FTO substrate would be horizontal, and a volatile electrolyte containing a volatile solvent formed of methoxyacetonitrile as a main solvent, 0.1 M lithium iodide, 0.05 M iodine and 0.5 M 4-tert-butylpyridine, was poured on the inner side of the first sealing section forming material.

Next, the counter electrode having the first sealing section forming material fixed thereon was arranged to face the working electrode, and the first sealing section forming material on the working electrode and the first sealing section forming material on the counter electrode were superimposed at atmospheric pressure. Then, the first sealing section forming materials were heated to melt at 148° C. while pressure was applied at 5 MPa, with the counter electrode interposed therebetween, using a pressing machine at atmospheric pressure, and thus a first sealing section was obtained. In this manner, a dye-sensitized solar cell was obtained. Meanwhile, in the dye-sensitized solar cell thus obtained, the radius of curvature of the curve line of the first sealing section was adjusted as indicated in Table 2.

Example 23

A dye-sensitized solar cell was produced in the same manner as in Example 22, except that the first wiring protective layer was changed from HIMILAN to an ethylene-methacrylic acid copolymer, NUCREL (manufactured by DuPont Mitsui Polychemicals Co., Ltd., melting point: 98° C.).

Example 24

A dye-sensitized solar cell was produced in the same manner as in Example 22, except that the first wiring protective layer was changed from HIMILAN to an ethylene-anhydrous vinyl acetate copolymer, BYNEL (manufactured by DuPont Company, melting point: 127° C.).

Example 25

A dye-sensitized solar cell was produced in the same manner as in Example 23, except that the second wiring protective layer was not formed.

Example 26

A dye-sensitized solar cell was produced in the same manner as in Example 22, except that the second wiring protective layer was not formed.

Example 27

A dye-sensitized solar cell was obtained in the same manner as in Example 22, except that the first wiring protective layer was not formed on the second wiring protective layer, the wiring protective layer was composed only of the second wiring protective layer formed from glass frit, and the radius of curvature of the curve line of the first wiring protective layer and the radius of curvature of the boundary line between the second wiring protective layer and the first wiring protective layer were adjusted as indicated in Table 2.

Example 28

A dye-sensitized solar cell was obtained in the same manner as in Example 22, except that the first wiring protective layer was not formed on the second wiring protective layer, the wiring protective layer was composed only of the second wiring protective layer formed of an epoxy resin, the radius of curvature of the curve line of the first wiring protective layer and the radius of curvature of the boundary line between the second wiring protective layer and the first wiring protective layer were adjusted as indicated in Table 2, and the second wiring protective layer was formed in the following manner.

That is, the second wiring protective layer was formed in the following manner. First, an epoxy resin (MAXIVE, manufactured by Mitsubishi Gas Chemical Co., Inc., temperature at which scorching occurs: 320° C.) was applied on the current-collecting wiring that surrounded the porous oxide semiconductor layer of the working electrode using a dispenser. Thereafter, by adjusting the ambient temperature to 100° C., the radius of curvature of the lines of the corner sections on the porous oxide semiconductor layer side (radius of curvature of the boundary line between the second wiring protective layer and the first wiring protective layer) at the contact surface between a cured product of the epoxy resin and the working electrode was adjusted to be 0.3 mm. In this manner, the second wiring protective layer was formed on the current-collecting wiring on the FTO substrate.

Example 29

A dye-sensitized solar cell was obtained in the same manner as in Example 22, except that the radius of curvature of the curve line of the first wiring protective layer and the radius of curvature of the boundary line between the second wiring protective layer and the first wiring protective layer were adjusted as indicated in Table 2, and the second wiring protective layer was formed in the following manner.

[Evaluation of Durability of Dye-Sensitized Solar Cell: Evaluation 1]

For the dye-sensitized solar cells obtained in Examples 1 to 29 and Comparative Examples 1 and 2, the photoelectric conversion efficiency ($\eta_0$) was measured. Subsequently, for the dye-sensitized solar cells, the photoelectric conversion efficiency ($\eta$) after standing for 1000 h in a high temperature-high humidity environment at 85° C. and 85% RH at atmospheric pressure was also measured. Then, the retention ratio of the photoelectric conversion efficiency was calculated based on the following formula:

Retention ratio (%) of photoelectric conversion efficiency=$\eta/\eta_0 \times 100$ The results are presented in Table 1 and Table 2.

TABLE 1

| | First sealing section (Electrolyte side) | Radius of curvature of curve line of first sealing section [mm] | First sealing section (Outer side) | Second sealing section | Radius of curvature of line on electrolyte side of second sealing section [mm] | Evaluation 1 Retention ratio of photoelectric conversion efficiency [%] |
|---|---|---|---|---|---|---|
| Example 1 | NUCREL | 2 | — | — | — | 61 |
| Example 2 | HIMILAN | 2 | — | — | — | 64 |
| Example 3 | BYNEL | 2 | — | NUCREL | 0.3 or less | 72 |
| Example 4 | BYNEL | 2 | — | HIMILAN | 0.3 or less | 73 |
| Example 5 | NUCREL | 2 | — | BYNEL | 0.3 or less | 78 |
| Example 6 | HIMILAN | 2 | — | BYNEL | 0.3 or less | 79 |
| Example 7 | HIMILAN | 2 | — | Epoxy resin | 0.3 or less | 82 |
| Example 8 | NUCREL | 2 | — | Epoxy resin | 0.3 or less | 83 |
| Example 9 | BYNEL | 2 | — | Epoxy resin | 0.3 or less | 85 |
| Example 10 | 31x-101 | 0.5 | — | Glass frit | 0.3 or less | 87 |
| Example 11 | HIMILAN | 0.5 | — | Glass frit | 0.3 or less | 86 |

TABLE 1-continued

| | First sealing section (Electrolyte side) | Radius of curvature of curve line of first sealing section [mm] | First sealing section (Outer side) | Second sealing section | Radius of curvature of line on electrolyte side of second sealing section [mm] | Evaluation 1 Retention ratio of photoelectric conversion efficiency [%] |
|---|---|---|---|---|---|---|
| Example 12 | NUCREL | 0.5 | — | Glass frit | 0.3 or less | 88 |
| Example 13 | BYNEL | 0.5 | — | Glass frit | 0.3 or less | 89 |
| Example 14 | 31x-101 | 1 | — | Glass frit | 0.3 or less | 91 |
| Example 15 | NUCREL | 2 | — | Glass frit | 0.3 or less | 93 |
| Example 16 | BYNEL | 2.5 | — | Glass frit | 0.3 or less | 95 |
| Example 17 | BYNEL | 5 | — | Glass frit | 0.3 or less | 96 |
| Example 18 | 31x-101 | 2 | 31x-101 | Glass frit | 1 | 97 |
| Example 19 | HIMILAN | 2 | HIMILAN | Glass frit | 1 | 98 |
| Example 20 | NUCREL | 2 | NUCREL | Glass frit | 1 | 98 |
| Example 21 | BYNEL | 2 | BYNEL | Glass frit | 1 | 99 |
| Comparative Example 1 | — | — | — | Glass frit | 0.3 or less | 45 |
| Comparative Example 2 | — | — | — | Epoxy resin | 0.3 or less | 31 |

TABLE 2

| | First sealing section (Electrolyte side) | Radius of curvature of curve line of first sealing section [mm] | First sealing section (Outer side) | Second sealing section | Radius of curvature of line on electrolyte side of second sealing section [mm] | First wiring protective layer | Radius of curvature of curve line of first wiring protective layer [mm] | Second wiring protective layer | Radius of curvature of boundary line between second wiring protective layer and first wiring protective layer [mm] | Evaluation 1 Retention ratio of photoelectric conversion ratio [%] |
|---|---|---|---|---|---|---|---|---|---|---|
| Example 22 | NUCREL | 2 | — | — | — | HIMILAN | 2 | Glass frit | 1 | 97 |
| Example 23 | NUCREL | 2 | — | — | — | NUCREL | 2 | Glass frit | 1 | 96 |
| Example 24 | NUCREL | 2 | — | — | — | BYNEL | 2 | Glass frit | 1 | 98 |
| Example 25 | NUCREL | 2 | — | — | — | NUCREL | 2 | — | — | 92 |
| Example 26 | NUCREL | 2 | — | — | — | HIMILAN | 2 | — | — | 93 |
| Example 27 | NUCREL | 2 | — | — | — | — | — | Glass frit | 0.3 or less | 81 |
| Example 28 | NUCREL | 2 | — | — | — | — | — | Epoxy resin | 0.3 | 84 |
| Example 29 | NUCREL | 2 | — | — | — | HIMILAN | 0.3 or less | Glass frit | 1 | 88 |

From the results indicated in Table 1 and Table 2, it was found that the dye-sensitized solar cells of Examples 1 to 29 had higher retention ratios of the photoelectric conversion efficiency as compared with the dye-sensitized solar cells of Comparative Examples 1 and 2.

Thus, it was confirmed that the photoelectric conversion elements of the present invention have excellent durability.

EXPLANATIONS OF REFERENCE NUMERALS

10 WORKING ELECTRODE (ELECTRODE)
13 POROUS OXIDE SEMICONDUCTOR LAYER
14a CURVE LINE
14b BOUNDARY LINE
14A FIRST SEALING SECTION
14B SECOND SEALING SECTION
16a CURVE LINE
16b BOUNDARY LINE (CURVE LINE)
16A FIRST WIRING PROTECTIVE LAYER
16B SECOND WIRING PROTECTIVE LAYER
17 CONDUCTIVE SUBSTRATE
20 COUNTER ELECTRODE (ELECTRODE)
30 ELECTROLYTE
40 SEALING SECTION
40C CORNER SECTION
100, 200 DYE-SENSITIZED SOLAR CELL (PHOTOELECTRIC CONVERSION ELEMENT)
218 WIRING SECTION
218A, 218B LINEAR SECTION
218C CONNECTING SECTION
r1 RADIUS OF CURVATURE OF CURVE LINE OF FIRST SURFACE
r2 RADIUS OF CURVATURE OF LINE ON ELECTROLYTE SIDE OF SECOND SURFACE
r3 RADIUS OF CURVATURE OF CURVE LINE OF THIRD SURFACE
r4 RADIUS OF CURVATURE OF PERIPHERY FACING POROUS OXIDE SEMICONDUCTOR LAYER OF FOURTH SURFACE
S CONTACT SURFACE (FIRST CONTACT SURFACE)
S1 FIRST SURFACE
S2 SECOND SURFACE
S3 THIRD SURFACE
S4 FOURTH SURFACE
A1 CONTACT SURFACE (SECOND CONTACT SURFACE)

The invention claimed is:

1. A photoelectric conversion element comprising:
a pair of electrodes that face each other;
an electrolyte that is disposed between the pair of electrodes; and
a sealing section that connects the pair of electrodes and is provided around the electrolyte,
wherein the sealing section comprises a corner section when the sealing section is viewed from a direction perpendicular to a principal plane of the pair of electrodes, a first contact surface in which the corner section of the sealing section contacts one of the pair of electrodes comprises a first curve line-containing surface containing a curve line that is located on a side of the sealing section that faces the electrolyte, the curve line is a line having a minimum radius of curvature of greater than 0.3 mm and less than or equal to 500 mm; wherein the sealing section comprises:

a first sealing section having the first curve line-containing surface, and a second sealing section having a second surface that is included in the first contact surface in which the corner section of the sealing section contacts the one of the pair of electrodes;

the second surface is located at an opposite side of the sealing section that is farther away from the electrolyte than the first curve line-containing surface; and wherein a radius of curvature of a boundary line between the second surface and the first contact surface is smaller than the radius of curvature of the curve line of the first sealing section.

2. The photoelectric conversion element according to claim 1, wherein the boundary line between the first surface and the second surface is curved.

3. The photoelectric conversion element according to claim 1, wherein the melting point of the first sealing section is lower than the melting point of the second sealing section.

4. The photoelectric conversion element according to claim 1, wherein the first sealing section is formed of a resin material, and the second sealing section is formed of an inorganic material.

5. The photoelectric conversion element according to claim 1, wherein any one electrode of the pair of electrodes comprises a conductive substrate, an oxide semiconductor layer provided on the conductive substrate, and a wiring section that is provided on the conductive substrate so as to surround the oxide semiconductor layer, the wiring section comprises a connecting section that connects a plurality of linear sections, the second contact surface between the connecting sections and the conductive substrate comprises a second curve line-containing surface containing a curve line in the periphery that faces the oxide semiconductor layer, and the wiring section comprises a current-collecting wiring provided on the conductive substrate, and a wiring protective layer that covers and protects the current-collecting wiring.

6. The photoelectric conversion element according to claim 5, wherein the wiring protective layer comprises:

a first wiring protective layer having the second curve line-containing surface; and a second wiring protective layer having a fourth surface that is included in the second contact surface between the connecting section and the conductive substrate, and that is disposed between a third surface which is the second curve line-containing surface of the first wiring protective layer and the current-collecting wiring.

7. The photoelectric conversion element according to claim 6, wherein the radius of curvature of the boundary line between the fourth surface and the third surface of the second wiring protective layer is smaller than the radius of curvature of the curve line of the first wiring protective layer.

8. The photoelectric conversion element according to claim 7, wherein the boundary line between the third surface and the fourth surface is a curved curve line.

9. The photoelectric conversion element according to claim 6, wherein the melting point of the first wiring protective layer is lower than the melting point of the second wiring protective layer.

10. The photoelectric conversion element according to claim 6, wherein the first wiring protective layer is formed of a resin material, and the second wiring protective layer is formed of an inorganic material.

11. The photoelectric conversion element according to claim 1, wherein the first sealing section is in contact with both electrodes of the pair of electrodes and the second sealing section is in contact with only the at least one of the pair of electrodes forming the second surface.

* * * * *